(12) United States Patent
Tebekaemi et al.

(10) Patent No.: US 11,399,042 B2
(45) Date of Patent: Jul. 26, 2022

(54) SECURE OVERLAY COMMUNICATION MODEL FOR DECENTRALIZED AUTONOMOUS POWER GRID

(71) Applicant: GEORGE MASON UNIVERSITY, Fairfax, VA (US)

(72) Inventors: Eniye Tebekaemi, McDonough, GA (US); Duminda Wijesekera, McLean, VA (US)

(73) Assignee: George Mason University, Fairfax, VA (US)

( * ) Notice: Subject to any disclaimer, the term of this patent is extended or adjusted under 35 U.S.C. 154(b) by 404 days.

(21) Appl. No.: 16/522,176

(22) Filed: Jul. 25, 2019

(65) Prior Publication Data
US 2020/0036748 A1 Jan. 30, 2020

Related U.S. Application Data

(60) Provisional application No. 62/703,090, filed on Jul. 25, 2018.

(51) Int. Cl.
*H04L 9/40* (2022.01)
*H02J 13/00* (2006.01)

(52) U.S. Cl.
CPC ...... *H04L 63/1466* (2013.01); *H02J 13/0017* (2013.01); *H04L 63/166* (2013.01)

(58) Field of Classification Search
CPC ............... H04L 63/1466; H04L 63/166; H04L 63/1441; H02J 2203/10; Y04S 10/16; Y04S 10/18
See application file for complete search history.

(56) References Cited

U.S. PATENT DOCUMENTS 9,936,552 B1 * 4/2018 Lau ................ H05B 45/10
10,027,699 B2 * 7/2018 Wei ................ G06F 21/552
(Continued)

FOREIGN PATENT DOCUMENTS

CN 106685928 A * 5/2017
JP 2017034746 A * 2/2017
(Continued)

*Primary Examiner* — Michael R Vaughan
(74) *Attorney, Agent, or Firm* — Morris, Manning & Martin, LLP; Daniel E. Sineway, Esq.; Daniel T. Begasse

(57) ABSTRACT

A system for autonomous control in power systems is disclosed. In particular, a secure overlay communication model ("SOCOM") is disclosed, the system including a combination of hardware and software for detecting power grid states, and determining appropriate actions for addressing detected states. The SOCOM is a logic-based system deployed onto computing devices such as field programmable gate arrays installed at bus controllers, Supervisory Control and Data Acquisition Systems ("SCADAs"), Intelligent Electronic Devices ("IEDs"), or other computing devices in power grid stations and substations. The logic-based nature of the SOCOM allows for seamless integration with preexisting power system equipment. In response to detecting various power grid faults such as line failures and over-current states, the system automatically rearranges power line configurations at the power stations and/or substations. The SOCOM further provides improvements relating to optimal power flow, cost-based power distribution, load management, voltage/volt-amp reactance ("VAR") optimization, and self-healing.

20 Claims, 24 Drawing Sheets

(56) References Cited

U.S. PATENT DOCUMENTS

| | | | | |
|---|---|---|---|---|
| 2009/0299542 | A1* | 12/2009 | Nuqui | H04L 41/0813 700/297 |
| 2010/0320838 | A1* | 12/2010 | Massie | H02J 3/00 307/39 |
| 2012/0284790 | A1* | 11/2012 | Bhargava | G06F 11/3612 726/22 |
| 2012/0310558 | A1* | 12/2012 | Taft | G06Q 30/00 702/61 |
| 2013/0036311 | A1* | 2/2013 | Akyol | H04L 9/3247 713/189 |
| 2013/0274941 | A1* | 10/2013 | Khozikov | H04L 63/1441 700/292 |
| 2014/0368147 | A1* | 12/2014 | Barrenscheen | G01R 19/0092 318/490 |
| 2015/0106934 | A1* | 4/2015 | Xaypanya | H04L 63/1416 726/23 |
| 2019/0103762 | A1* | 4/2019 | Dolezilek | H02J 3/381 |

FOREIGN PATENT DOCUMENTS

| | | | | |
|---|---|---|---|---|
| WO | WO-2012175339 A2 | * | 12/2012 | H02J 3/008 |
| WO | WO-2014130015 A1 | * | 8/2014 | G06Q 50/00 |

* cited by examiner

|   | 1 byte | 1 byte | 1 byte | 1 byte |
|---|---|---|---|---|
| 1 | protoID | version | srcBus | destBus |
| 2 | msgType | status | nextBus | busCount |
| 3 | lineNo | cost | msgID ||
| 4 | resourceID || resourceType ||
| 5 | maxCapacity || AvailCapacity ||
| 6 | reserved ||||
| 7 | TIMESTAMP ||||
| 8 | ||||

*FIG. 6(a)*

|   | 1 byte | 1 byte | 1 byte | 1 byte |
|---|---|---|---|---|
| 1 | protoID | version | srcBus | destBus |
| 2 | msgType | controlType | action | controlState |
| 3 | controlInfo || resourceID ||
| 4 | resourceType || msgID ||
| 5 | reserved ||||
| 6 | ||||
| 7 | timestamp ||||
| 8 | ||||

*FIG. 6(b)*

|   | 1 byte | 1 byte | 1 byte | 1 byte |
|---|---|---|---|---|
| 1 | protoID | version | srcBus | destBus |
| 2 | msgType | lineNo | msgID ||
| 3 | statusInfo || busVoltage ||
| 4 | loadCurrent || phaseAngle ||
| 5 | reserved ||||
| 6 | ||||
| 7 | timestamp ||||
| 8 | ||||

*FIG. 6(c)*

| Field | Bytes | Description |
|---|---|---|
| protoID | 1 | Identify protocol as SOCOM |
| version | 1 | Protocol version |
| srcBus | 1 | Source bus |
| destBus | 1 | Destination bus |
| msgType | 1 | Identifies message type as RDP |
| status | 1 | Operational state of the resource |
| hostBus | 1 | The bus the resource is connected to |
| busCount | 1 | Count of the number of buses in a path to the resource |
| lineNo | 1 | Transmission line referenced in the message |
| cost | 1 | Cost of using the resource |
| msgID | 2 | Unique message identifier |
| resourceID | 2 | Unique resource identifier |
| resourceType | 2 | type of resource e.g. generator |
| maxCapacity | 2 | Maximum capacity of the resource |
| availCapacity | 2 | Available capacity of the resource |
| reserved | 4 | for future use |
| timestamp | 8 | Message generation time |

Table III: RDP Message Field Description

*FIG. 15*

| Field | Bytes | Description |
| --- | --- | --- |
| protoID | 1 | Identify protocol as SOCOM |
| version | 1 | Current protocol version |
| srcBus | 1 | Source bus |
| destBus | 1 | Destination bus |
| msgType | 1 | Identify message type as CRP |
| controlType | 1 | Identifies if the message is a control request, control response, or control information message |
| action | 1 | Control action (open/close for switches) |
| controlState | 1 | Resource state (open/close for switches) |
| controlInfo | 2 | Purpose of the control (e.g. restoration, regulation) |
| resourceID | 2 | Resource identifier |
| resourceType | 2 | Resource type |
| msgID | 2 | Message identifier |
| reserved | 8 | for future use |
| timestamp | 8 | Message transmission time |

Table IV: CRP Message Field Description

*FIG. 16*

| Field | Bytes | Description |
| --- | --- | --- |
| protoID | 1 | Identify protocol as SOCOM |
| version | 1 | Protocol version |
| srcBus | 1 | Source bus |
| destBus | 1 | Destination bus |
| msgType | 1 | Identifies message subtype as RDP |
| lineNo | 1 | Transmission line in message |
| statusInfo | 2 | Bus status |
| msgID | 2 | Message identifier |
| busVoltage | 2 | Voltage at the bus |
| loadCurrent | 2 | Total current flowing out of the bus |
| busAngle | 2 | Phase angle at the bus |
| reserved | 8 | for future use |
| timestamp | 8 | Message generation time |

Table V: SUP Message Field Description

*FIG. 17*

| Line State | Line Current | Connection |
|---|---|---|
| Overcurrent | $z^I_{LVI_{i,j}} \geq I^O_{i,j}$ | $a_{i,j} = 1$ |
| Fault Active | $0 \leq z^I_{LVI_{i,j}} < I^O_{i,j}$ | $a_{i,j} = 1$ |
| Inactive | $z^I_{LVI_{i,j}} < I_R$ | $a_{i,j} = 0$ |

Table VI: Line State Identification Table

FIG. 18

|  | MAC | IP | UDP |
|---|---|---|---|
| Propagation Delay | 0.04ms | 0.04ms | 0.04ms |
| Processing Delay | 0.784ms | 0.838ms | 0.879ms |
| Longest Path | 2.20ms | 2.22ms | 2.26ms |
| Converge (time) | 24.18ms | 27.5ms | 30.24ms |
| Converge (messages) | 68 | 68 | 68 |

Table VII: Resource Discovery Statistics

FIG. 19

Table VIII. Transmission Line Parameters

| Simulink | | ABCD | |
|---|---|---|---|
| $r =$ | 0.11533 | $A =$ | 0.99966 + 9.84762e-5i |
| $l =$ | 0.0010478 | $B =$ | 2.30608 + 7.89941i |
| $c =$ | 1.1326e-8 | $C =$ | -2.80328-9 + 8.53864e-5i |
| $l_{sec} =$ | 20 | $D =$ | 0.99966 + 9.84762e-5i |

FIG. 20

Table IX. Sending and Receiving Voltages and Current

| Send Voltage | Send Current | Receive Voltage | Receive Current | Estimated Send Voltage | Estimated Send Current | Estimation Error Voltage | Estimation Error Current | LOAD MW | LOAD MVar |
|---|---|---|---|---|---|---|---|---|---|
| 230042.2903 | 30.9731 | 229984.2252 | 30.2597 | 230042.2907 | 30.9755 | 0.00003731 | 0.00023774 | 10 | 3 |
| 229961.4294 | 57.9377 | 229767.7177 | 60.4624 | 229961.4297 | 57.9391 | 0.00003739 | 0.00014165 | 20 | 6 |
| 229880.2786 | 86.9962 | 229550.9877 | 90.6080 | 229880.279 | 86.9972 | 0.00003747 | 0.00010399 | 30 | 9 |
| 229798.8410 | 116.5491 | 229334.0394 | 120.6965 | 229798.8414 | 116.5499 | 0.00003754 | 0.00008481 | 40 | 12 |
| 229717.1195 | 146.2617 | 229116.877 | 150.7228 | 229717.1199 | 146.2623 | 0.00003762 | 0.00007328 | 50 | 15 |
| 229717.1195 | 146.2617 | 229116.877 | 150.7228 | 229717.1199 | 146.2625 | 0.00003770 | 0.00006561 | 60 | 18 |
| 229552.8363 | 205.7891 | 228681.9263 | 210.6183 | 229552.8367 | 205.7897 | 0.00003778 | 0.00006015 | 70 | 21 |
| 229470.2804 | 235.5341 | 228464.1463 | 240.4773 | 229470.2808 | 235.5346 | 0.00003786 | 0.00005608 | 80 | 24 |
| 229387.4522 | 265.2463 | 228246.1686 | 270.2790 | 229387.4525 | 265.2468 | 0.00003794 | 0.00005288 | 90 | 27 |
| 229304.3545 | 294.9181 | 228027.9972 | 300.0230 | 229304.3548 | 294.9186 | 0.00003801 | 0.00005034 | 100 | 30 |
| 229220.9902 | 324.5447 | 227809.6364 | 329.7092 | 229220.9905 | 324.5452 | 0.00003809 | 0.00004826 | 110 | 33 |
| 229137.3621 | 354.1229 | 227591.0890 | 359.3577 | 229137.3625 | 354.1234 | 0.00003816 | 0.00004652 | 120 | 36 |
| 229053.4731 | 383.6504 | 227372.362 | 388.9084 | 229053.4735 | 383.6508 | 0.00003824 | 0.00004506 | 130 | 39 |
| 228969.3200 | 413.1256 | 227153.4564 | 418.4212 | 228969.3264 | 413.1260 | 0.00003832 | 0.00004380 | 140 | 42 |
| 228884.9256 | 442.5473 | 226934.3773 | 447.8761 | 228884.924 | 442.5477 | 0.00003839 | 0.00004270 | 150 | 45 |
| 228800.2688 | 471.9147 | 226715.1285 | 477.2729 | 228800.2692 | 471.9151 | 0.00003846 | 0.00004175 | 160 | 48 |
| 228715.3643 | 501.2270 | 226495.7139 | 506.6117 | 228715.3647 | 501.2274 | 0.00003854 | 0.00004090 | 170 | 51 |
| 228630.2129 | 530.4836 | 226276.1375 | 535.8924 | 228630.2133 | 530.4840 | 0.00003861 | 0.00004014 | 180 | 54 |
| 228544.8174 | 559.6842 | 226056.4032 | 565.1149 | 228544.8178 | 559.6846 | 0.00003869 | 0.00003947 | 190 | 57 |
| 228459.1805 | 588.8283 | 225836.5146 | 594.2791 | 228459.1809 | 588.8287 | 0.00003876 | 0.00003885 | 200 | 60 |

FIG. 21

| CRITICAL | HIGH | NORMAL | N/A |
|----------|------|--------|-----|
| Bus 6 | Bus 8 | Bus 10 | Bus 5 |
| | Bus 11 | | |

Table X: Load Priorities

*FIG. 22*

| Protocol | Average Time(ms) | Trigger |
|----------|------------------|---------|
| RDP | 0.647 | Status change |
| CRP | 0.885 | Instant |
| SUP | 0.56 | Status change/Every 5s |

Table XI: SOCOM message execution times

*FIG. 23*

Algorithm 1 RDP Algorithm

1: procedure RESOURCEDISCOVERY()
2:    if resourceBus && val_new ≠ val_old then
3:       rdpMsg:=createRDP(RSC,src=a,cnt=1)
4:       send(rdpMsg,dest=ALL)
5:    if rdpRecv(rdpMsg0)==TRUE then
6:       if RSCTable==EMPTY then
7:          updateTable(rdpMsg0)
8:          rdpMsg1:=updateRDP(rdpMsg0,src=a,cnt++))
9:          send(rdpMsg1,dest=ALL - rdpMsg0.src)
10:      else
11:         temp=FALSE
12:         for $i = 0, i <$ sizeof(RSCTable), $i++$ do
13:            if rdpMsg.src == RSCTable[i].src && rdpMsg.RSC == RSCTable[i].RSC then
14:               temp=TRUE
15:               BREAK
16:         if !temp then
17:            RSCTable[i] = rdpMsg0
18:            rdpMsg1:=update(rdpMsg0,src=a,cnt++))
19:            send(rdpMsg1,dest=ALL-rdpMsg0.src)
20:         if temp && rdpMsg.cnt < RSCTable[i].cnt then
21:            RSCTable[i] = rdpMsg0
22:            rdpMsg1:=update(rdpMsg0,src=a,cnt++))
23:            send(rdpMsg1,dest=ALL-rdpMsg0.src)
24:         if temp && rdpMsg.time > RSCTable[i].time then
25:            RSCTable[i] = rdpMsg0
26:            rdpMsg1:=update(rdpMsg0,src=a,cnt++))
27:            send(rdpMsg1,dest=ALL-rdpMsg0.src)

*FIG. 24*

Algorithm 2 Self-Healing Algorithm

1: procedure SELFHEALING()
2:     if $(V^{min} \leq Z^V_{LVI_i} \leq V^{max}) \wedge CRPMsgRecv(msg)$ then
3:         $a^{ext}_{i,j} = \text{getControlAction}(msg)$
4:         $sourceCon = \text{checkLoad}([GEN^{avail}_E]_v, msg.LD_j)$
5:         $lineCon = \text{checkLine}(I^{max}_{i,j}, Z^V_{LVI_i}, msg.LD_j)$
6:         if $sourceCon \wedge lineCon$ then
7:             $\text{connect}(a_{i,j} = a^{ext}_{i,j})$
8:             goto 2
9:     bus.STATE = RECOVER
10:    $\text{disconnect}([a_{i,j}]_{1 \times M_i}) = 0)$
11:    for $z_{i,j} : Z_{RVI_i}$ do
12:         if $!(V^{min} \leq z^V_{i,j} \leq V^{max})$ then
13:             continue
14:         $inTable[] \mathrel{+}= z_{i,j}$
15:         $sourceCon = \text{checkLoad}([GEN^{avail}_E]_v, LD_j)$
16:         $lineCon = \text{checkLine}(I^{max}_{i,j}, z^V_{i,j}, LD_j)$
17:         if $sourceCon \wedge lineCon$ then
18:             $\text{connect}(inTable, a_{i,j} = 1)$
19:             $\text{sendCRP}(inTable, a^{ext}_{i,j} = 1)$
20:             if $V^{min} \leq Z^V_{LVI_i} \leq V^{max}$ then
21:                 bus.STATE = NORMAL
22:                 goto 2
23:             else $inTable[] \mathrel{-}= z_{i,j}$
24:         if $sourceCon == FALSE$ then
25:             goto 26
26:    bus.STATE = BAD
27:    badStateTimer.start()
28:    while $badStateTimer < badStateTimeout$ do
29:         continue
30:    goto 2

*FIG. 25*

Algorithm 3 Self-Healing With Priority Load Algorithm
1: procedure PRIORITYSELFHEALING()
2:     if $(V^{min} \leq Z^V_{LV_{l_i}} \leq V^{max}) \wedge CRPMsgRecv(msg)$ then
3:         $a^{crd}_{i,j}$ = getControlAction($msg$)
4:         sourceCon = checkLoad($[GEN^{avail}_g]_g$, $msg.LD_j$)
5:         lineCon = checkLine($I^{max}_{ij}$, $Z^V_{LV_{l_i}}$, $msg.LD_j$)
6:         if sourceCon $\wedge$ lineCon then
7:             connect($a_{i,j} = a^{crd}_{i,j}$)
8:         goto 2
9:     bus.STATE= RECOVER
10:     disconnect($[a_{i,j}]_{1 \times M_j} = 0$)
11:     disconnect($a^{LD_j}_c = 0$)
12:     for $z_{i,j} : Z_{RV_{l_i}}$ do
13:         if !($V^{min} \leq z^V_{i,j} \leq V^{max}$) then
14:             continue
15:         connect(inTable, $a_{i,j} = 1$)
16:         sendCRP(inTable, $a^{crd}_{i,j} = 1$)
17:         if $V^{min} \leq Z^V_{LV_{l_i}} \leq V^{max}$ then
18:             break
19:     delay = random(bus.Class)
20:     timer.start()
21:     while timer < delay do
22:         continue
23:     for load:RDPLoadTable do
24:         if load.Class > bus.Class then
25:             goto: 19
26:     for $z_{i,j} : Z_{RV_{l_i}}$ do
27:         inTable += $z_{i,j}$
28:         sourceCon = checkLoad($[GEN^{avail}_g]_g$, $LD_j$)
29:         lineCon = checkLine($I^{max}_{ij}$, $z^V_{i,j}$, $LD_j$)
30:         if sourceCon $\wedge$ lineCon then
31:             connect($a^{LD_j}_c = 1$)
32:             bus.STATE = NORMAL
33:             goto 2
34:         if sourceCon == FALSE then
35:             goto 37
36:         else inTable -= $z_{i,j}$
37:     bus.STATE = BAD
38:     badStateTimer.start()
39:     while badStateTimer < badStateTimeout do
40:         continue
41:     goto 2

FIG. 26

Algorithm 4 Data Validation Stage 2 Algorithm

1: procedure DATAVALIDATION2($msgSUP$)
2:     $Z^V_{RVI_{i,j}}$ = computeEstVolt($x_{i,j}, Z^V_{LVI_{i,j}}$)
3:     $Z^I_{RVI_{i,j}}$ = computeEstCurr($x_{i,j}, Z^I_{LVI_{i,j}}$)
4:     if $|Z^V_{RVI_{i,j}} - msgSUP.Z^V_{RVI_{i,j}}| < \zeta^V$ then
5:       return
6:     if $|Z^I_{RVI_{i,j}} - msgSUP.Z^I_{RVI_{i,j}}| < \zeta^V$ then
7:       return
8:     /*line not active*/
9:     if $a_{i,j} \neq a^{on}_{i,j}$ then
10:       if $Z^I_{LVI_{i,j}} < I_R$ then
11:         return
12:     Alert()
13:     responseStrategy()
14:     return

*FIG. 27*

Algorithm 5 State Validation Algorithm

1: procedure STATEVALIDATION
2:     totalLOAD = $\sum_{q=1}^{Q} LD_q$
3:     totalSRC = $\sum_{r=1}^{R} GEN_r^{prod}$
4:     if totalLOAD + $\varpi$ < totalSRC then
5:       return
6:     totalCurrIN = $\sum_{j=1}^{J} Z^I_{RVI_{i,j}}$
7:     totalCurrOUT = $\sum_{k=1}^{K} Z^I_{RVI_{i,k}}$
8:     if totalCurrIN - totalCurrOUT $\leq \beta$ then
9:       return
10:     detected = $FALSE$
11:     for k=1,k < $M_i$,k++ do
12:       powerSND = $x_{i,k} \cdot Z^V_{LVI_{i,k}} * x_{i,k} \cdot Z^I_{LVI_{i,k}}$
13:       powerRCV = $Z^V_{RVI_{i,k}} * Z^I_{RVI_{i,k}}$
14:       if powerSND + $\Gamma \neq$ powerRCV then
15:         detected = $TRUE$
16:     if !detected then
17:       return
18:     Alert()
19:     responseStrategy()
20:     return

*FIG. 28*

Algorithm 6 Process Validation Algorithm

1: procedure PROCESSVALIDATION(msgCRP)
2:     A = msgCRP.Type == *REQUEST*
3:     B = msgCRP.Info == *HEAL*
4:     C = msgCRP.BusState == *RECOVER*
5:     msgSUP = getSUPMsg(supTable, msgCRP.BusID)
6:     D = msgSUP.BusState == *FAIL*
7:     E = *DATAVALIDATION2(msgSUP)*
8:     F = *STATEVALIDATION()*
9:     $G = V^{min} < Z^V_{LVL_2} < V^{max}$
10:     if A,B,C,D,E,F && G then
11:         return
12:     Alert()
13:     responseStrategy()
14:     return

*FIG. 29*

Algorithm 7 Response Strategy

1: procedure RESPONSESTRATEGY(bus)
2:     *extern* attackCounter
3:     *extern* keyChgCounter
4:     *extern* commBlockCounter
5:     Alert()
6:     attackCounter++
7:     if attackCounter == maxAttackThreshold then
8:         changeEnforceLayer()
9:         attackCounter = 0
10:         keyChgCounter++
11:     if keyChgCounter == maxLayerChg then
12:         changeEncKey()
13:         keyChgCounter = 0
14:         commBlockCounter++
15:     if commBlockCounter == maxCommBlock then
16:         blockComm(bus)
17:         if |bus| == autoThreshold then
18:             disableAuto()

*FIG. 30*

SECURE OVERLAY COMMUNICATION MODEL FOR DECENTRALIZED AUTONOMOUS POWER GRID

CROSS REFERENCE TO RELATED APPLICATIONS

This application claims the benefit of, and priority to, U.S. Provisional Patent Application No. 62/703,090 filed on Jul. 25, 2018, and entitled "SECURE OVERLAY COMMUNICATION MODEL FOR DECENTRALIZED AUTONOMOUS POWER GRID," the disclosure of which is incorporated by reference as if there same were set forth herein in its entirety.

BACKGROUND

Properly functioning power grids are critically important, yet often overlooked, aspects of modern society. Traditional power grid architectures are outdated and generally operate in centralized systems, where one device or system component is responsible for the effective operation of large portions of the grid (if not the entire grid). Society's reliance on power grids, in combination with outdated power grid architectures, makes these grids popular targets for malicious attacks. Therefore, there exists a long-felt but unresolved need for power grid systems utilizing decentralized control architectures and bus controllers for improving overall power grid performance and resiliency against attacks.

BRIEF SUMMARY OF DISCLOSURE

The present systems and methods relate generally to smart power grids, and more particularly to smart power grids with an integrated secure overlay communication model ("SOCOM") for decentralizing control architectures and bus controllers in power grids. The systems described herein present improvements to conventional power grids, specifically improvements relating to optimal power flow, cost-based power distribution, load management, voltage/volt-amp reactance ("VAR") optimization, and self-healing. In various embodiments, the SOCOM is a secure overlay for a decentralized communication power grid model that runs as a middle-ware using TCP/IP communication infrastructures of power utilities. In particular embodiments, the SOCOM creates a logically decentralized network for the efficient operation of decentralized automation functions.

In various embodiments, the SOCOM provides at least the following technical advantages over conventional systems:

Administration: The SOCOM is generally a logic-based system, therefore system administrators (or engineers) may still directly access underlying communication networks and retain the ability to observe and intercede in administering the power system. In conventional systems, administrators are reluctant to cede control of power systems to autonomous intelligent electronic devices (LEDs).

Cost: Installing the SOCOM generally does not require structural modification to existing communication infrastructures. In one embodiment, the overlay middle-ware is implemented between the automation functions and the physical communications network in existing systems.

Portability: In various embodiments, the SOCOM may communicate over Ethernet, wireless Internet, transport or application layers of the TCP/IP network, and implementation depends on the objectives and requirements of the system administrators/users.

Ease of Use: In various embodiments, the SOCOM allows for the implementation of automation functions regardless of the physical communication layer and communication protocols.

Implementation: In particular embodiments, the SOCOM is lightweight and suitable for direct hardware implementation on field electronic devices and field programmable gate array (FPGA) based controllers.

Security: According to various aspects of the present disclosure, physical properties of the power grid validate messages exchanged over the communications network in real-time, therefor providing resilience to data modification attacks.

These and other aspects, features, and benefits of the disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 6(a) is an exemplary resource discovery message byte structure, according to one aspect of the present disclosure.

FIG. 6(b) is an exemplary control request message byte structure, according to one aspect of the present disclosure.

FIG. 6(c) is an exemplary status update message byte structure, according to one aspect of the present disclosure.

FIG. 15 is a table including the resource discovery protocol message field description, according to one aspect of the present disclosure.

FIG. 16 is a table including the control request protocol message field description, according to one aspect of the present disclosure.

FIG. 17 is a table including the status update protocol message field description, according to one aspect of the present disclosure.

FIG. 18 is a table including exemplary line state identification parameters, according to one aspect of the present disclosure.

FIG. 19 is a table including exemplary resource discovery statistics, according to one aspect of the present disclosure.

FIG. 20 is a table illustrating exemplary transmission line parameters, according to one aspect of the present disclosure.

FIG. 21 is a table including exemplary sending and receiving voltages and currents, according to one aspect of the present disclosure.

FIG. 22 is a table including exemplary load priorities, according to one aspect of the present disclosure.

FIG. 23 is a table including exemplary SOCOM message execution times, according to one aspect of the present disclosure.

FIG. 24 is an exemplary resource discovery protocol algorithm, according to one aspect of the present disclosure.

FIG. 25 is an exemplary self-healing algorithm, according to one aspect of the present disclosure.

FIG. 26 is an exemplary self-healing with priority load algorithm, according to one aspect of the present disclosure.

FIG. 27 is an exemplary data validation algorithm, according to one aspect of the present disclosure.

FIG. 28 is an exemplary state validation algorithm, according to one aspect of the present disclosure.

FIG. 29 is an exemplary process validation algorithm, according to one aspect of the present disclosure.

FIG. 30 is an exemplary response strategy algorithm, according to one aspect of the present disclosure.

DETAILED DESCRIPTION OF DRAWINGS

Figure 1:
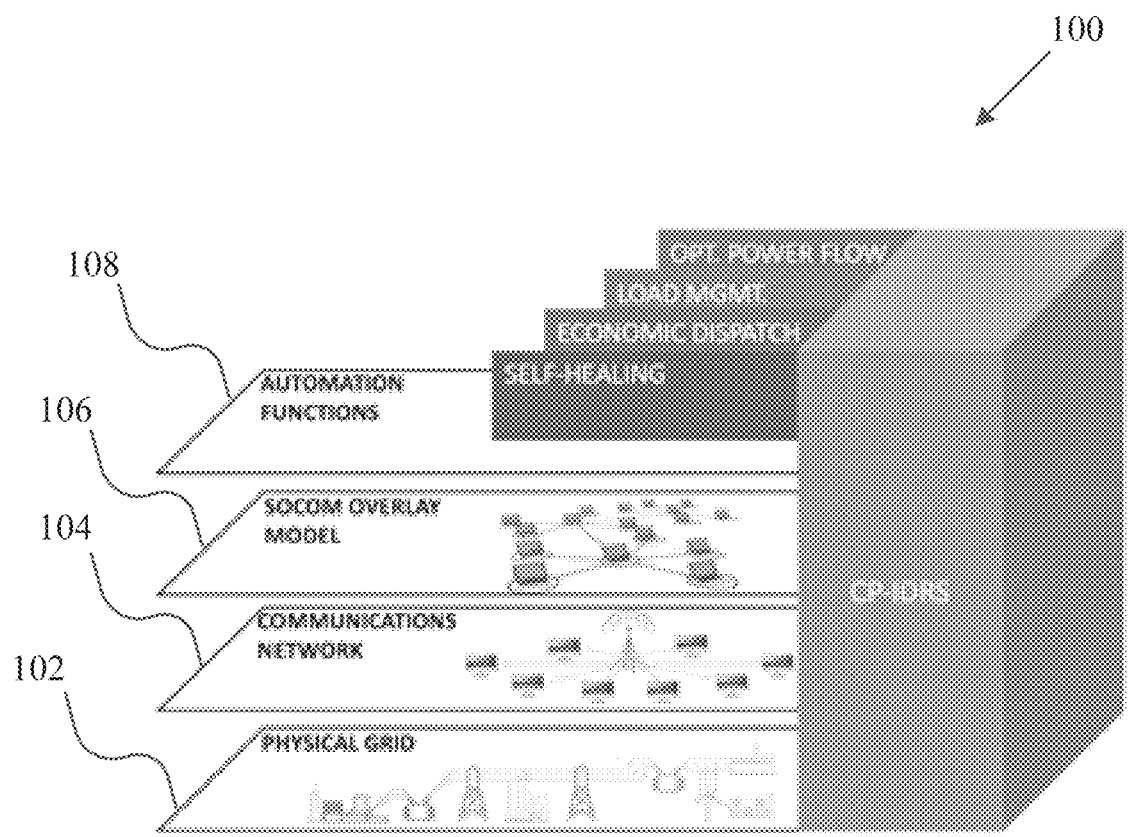
FIG. 1 is an exemplary system operating environment, according to one aspect of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Briefly described, and according to one embodiment, aspects of the present disclosure relate generally to smart power grids, and more particularly to smart power grids with an integrated secure overlay communication model ("SOCOM") for decentralizing control architectures and bus controllers in power systems. The systems described herein present improvements to conventional power grids, specifically improvements relating to optimal power flow, cost-based power distribution, load management, voltage/volt-amp reactance ("VAR") optimization, and self-healing. In various embodiments, the SOCOM is a secure overlay for a decentralized communication power grid model that runs as a middle-ware using TCP/IP communication infrastructures of power utilities. In particular embodiments, the SOCOM creates a logically decentralized network for the efficient operation of decentralized automation functions.

Turning now to the drawings, FIG. 1 illustrates a diagram of a power grid architecture 100 with an integrated SOCOM, according to one aspect of the present disclosure. In a particular embodiment, the power grid architecture 100 includes multiple layers of functionality, where each layer may include a combination of hardware and software. As shown in the present embodiment, the power grid architecture 100 includes a physical grid 102, a communications network 104, a SOCOM overlay model 106, and an automation functions layer 108. According to various aspects of the present disclosure, the components and layers of the power grid architecture 100 allow for a cyber-physical intrusion detection system model (illustrated as CP-IDRS in the present embodiment) which further allows for technical advancements such as self-healing, economic dispatch, load management, and optimal power flow within the architecture 100. In one embodiment, the base of the architecture described herein is the physical grid 102, which may be an existing power grid system owned or maintained by governments, power companies, etc. According to various aspects of the present disclosure, the power grid 102 includes towers, power lines, and transformers that carry power from a generation source (e.g., a power plant) to end destinations and loads (e.g., buildings).

In one embodiment, the communication network 104 is "layered above" the physical grid 102, such that the communication network 104 may detect or "read" physical aspects of the grid (e.g., voltage/current levels) and furthermore transmit the readings across the communication network 104. In various embodiments, the communication network 104 includes a plurality of computing devices (e.g., servers, desk top computers, mobile computing devices, etc.) for communicating aspects of the state of the power grid 102 across the network. In particular embodiments, the communication network 104 is layered above the physical grid 102 such that the plurality of computing devices are operatively connected to the physical grid 102 at various locations, allowing the communications networks 104 to function as an extension of the physical grid 102.

In particular embodiments, the SOCOM overlay model 106 is implemented as a layer above the communications network 104 (e.g., the SOCOM is configured to operate in conjunction with, or as an extension to, the communication networks 104). According to various aspects of the present disclosure, the SOCOM overlay model 106 allows for various automation functions 108 to be configured within the architecture 100. For example, the self-healing, economic dispatch, load management, and optimal power flow functionalities of the architecture are facilitated by the SOCOM overlay model 106. As will be discussed throughout the disclosure herein, various algorithms, such as a decentralized gossip-based algorithm, allow for the SOCOM to provide these technical improvements.

Figure 2:
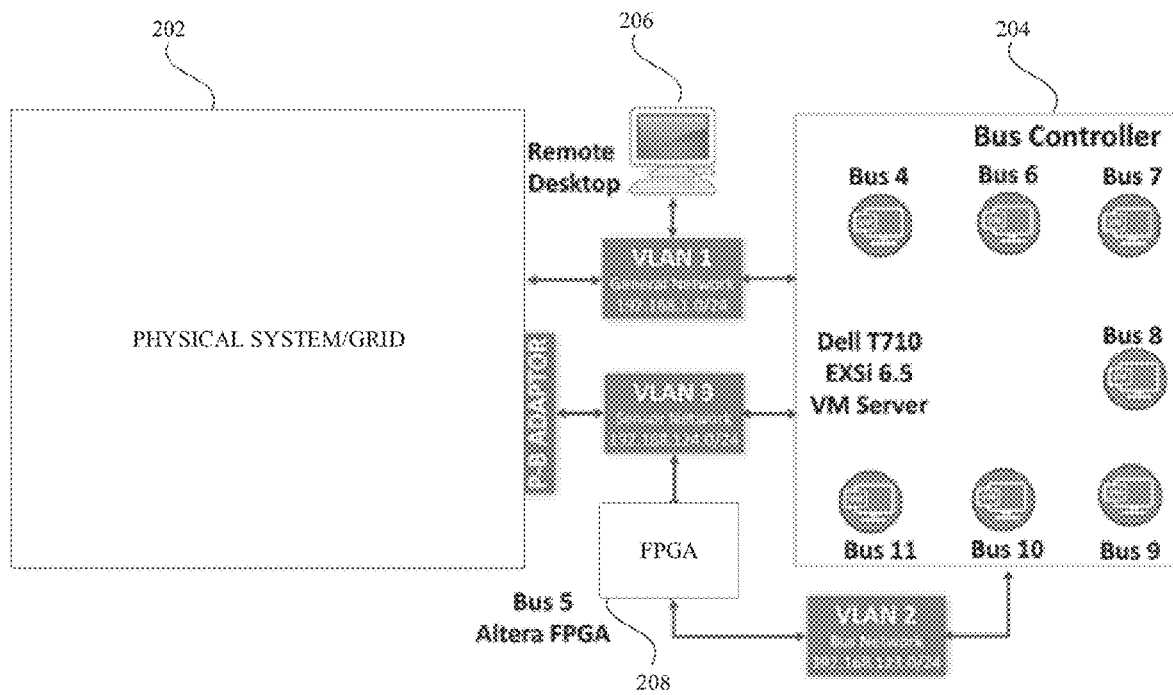
FIG. 2 is an exemplary SOCOM architecture, according to one aspect of the present disclosure.

Turning now to FIG. 2, an implementation diagram of the exemplary SOCOM is shown, according to one aspect of the present disclosure. In various embodiments, the SOCOM is operable to be integrated into power grid systems, such as the system presented in FIG. 1. However, the software-definable nature of the SOCOM allows for the system to be modeled using small-scale computing hardware, such as computer servers, field programmable gate arrays (FPGAs), remote desktops/laptops, and other components. As shown in the present embodiment, the SOCOM system may be designed and implemented in a small-scale power system within a confined and controlled computing environment. In various embodiments, the implementation environment may include a physical system 202 (or physical power grid), a bus controller 204, a remote desktop 206, and an FPGA 208, each connected over various virtual local area networks (VLANs). In one embodiment, a first VLAN (VLAN 1) connects the remote desktop 206 to the physical system 202 and the bus controller 204 over a general network. In a particular embodiment, a second VLAN (VLAN 2) connects the bus controller 204 to the FPGA 208 over a bus network. In certain embodiments, a third VLAN (VLAN 3), connects the physical system 202 to the bus controller 204 and also the FPGA 208. In some embodiments, the VLAN 3 may communicate with a physical-to-bus ("P-B") adapter.

In a particular embodiment, the physical system 202 includes one or more computing devices configured to simulate a power grid using Matlab/Simulink Simscape Power System and Simulink Real-Time applications. According to various aspects of the present disclosure, the physical system 202 is configured to replicate the characteristics and behaviors of a real-life power grid. In one embodiment, the Simscape Power System provides component libraries and analysis tools for modeling and simulating electrical power systems. In a particular embodiment, the Simulink Real-Time may create real-time applications from Simulink models that run directly on dedicated target computing systems. In certain embodiments, these applications enable implementing and running an 11-bus physical power grid in real-time on a Mac Pro server (3 GHz 8-Core Intel Xeon E5, 64 GB RAM). The physical power grid includes three power generator sources, three transformers (one for each source), five load buses, current/voltage sensors and switchgear devices. In certain embodiments, the physical system 202 may be an electronic power grid (e.g., a microgrid, smart grid, etc.), such as the grid depicted in association with FIG. 4, and the grid may include power system stations and substations.

In one embodiment, the bus controller 204 includes eight separate bus controllers based on the SOCOM communication/control protocol. In the present embodiment, seven of the eight buses are implemented as virtual machines, and the remaining is/are implemented on the FPGA 208. The seven (or however many are appropriate) virtual machines may run on a VMWare ESXi server in a Dell T710 server (2.66 GHz 6-Core x2 Intel Xeon X5650 64 GB RAM). Each bus controller may receive sensor measurements and send control messages to the corresponding physical bus over User Datagram Protocol ("UDP") messages through the physical-Bus Controller (P-B) Adaptor. In various embodiments, the P-B adaptor routes UDP packets from physical buses to corresponding bus controllers, and from bus controllers to corresponding physical buses.

In certain embodiments, a large-scale industrial implementation of the architecture depicted in FIG. 2 may include supervisory control and data acquisition ("SCADA") systems at power utility stations and substations. According to various aspects of the present disclosure, SOCOM logic may be deployed within SCADA controllers at the substation level, where the SOCOM logic may determine how power states detected at the substation are addressed. In other embodiments, the SOCOM logic may be deployed at switches/breakers controlling IEDs in microgrids (campus grids) to automate power control functions, or the SOCOM logic may be deployed at an FPGA functioning as an autonomous smart switch/breaker. Generally, the SOCOM logic can be implemented anywhere autonomous control is desired in a power distribution system.

In embodiments where the SOCOM logic is deployed at a power system substation, power lines serving the substation are generally equipped with sensors and actuators, where the sensors monitor the power system state, and the actuators modify the power system state. According to various aspects of the present disclosure, the sensors may send system state information to the controllers (e.g., bus controllers), and the controllers may use the provided information to make control decisions sent to actuators to implement. Furthermore, a substation generally has multiple (two or more) power lines connected to it, and depending on the power flow configuration, some power lines may be active and some may be inactive. In a particular embodiment, in the event of a power failure, an inactive power line may be activated to draw power from a neighboring station. According to various aspects of the present disclosure, this may be achieved by reconfiguring the state of the switches connecting the power lines to the sub station.

I. The SOCOM Model

In one embodiment, the SOCOM integrates communications and control as first-class objectives. In various embodiments, to take advantage of the double couple characteristics of the smart grid, each control unit is modeled as a node that communicates with other physically connected nodes. In certain embodiments, the double coupling characteristic is achieved by obtaining information using; (1) network communications—sending state (voltage and current) information through the network communication channels and (2) sensing voltage and current values from power transmission lines.

A. The Power System Model

Figure 3:
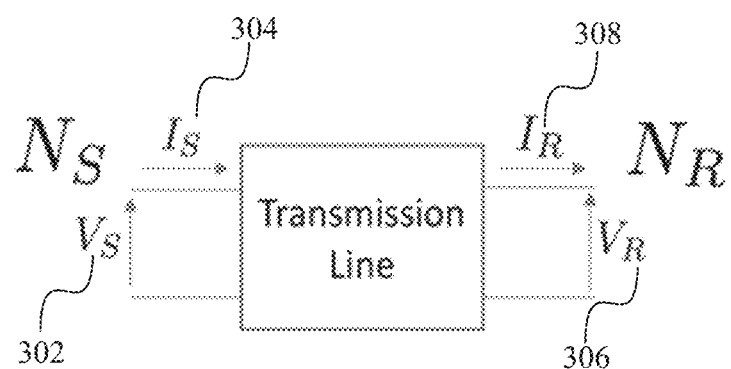
FIG. 3 is an exemplary system power transmission line, according to one aspect of the present disclosure.

In one embodiment, the physical microgrid system is modeled based on the power transfer properties of power transmission lines. According to various aspects of the present disclosure, the model includes pairs of sending and receiving power nodes, as shown in FIG. 3. Prior to defining the precise model, consider ($V_S$ 302 and $I_S$ 304) are the sending end voltage and current pairs, and ($V_R$ 306 and $I_R$ 308) are the receiving end voltage and current pairs as shown in FIG. 3. In one embodiment, the relationship between the voltage and current in the output and input terminals is given in Equations (1).

$$V_S = AV_R + BI_R$$

$$I_S = CV_R + DI_R \qquad (1)$$

In Equation (1), A, B, C, and D are constants known as the transmission parameters or chain parameters: $A = V_S/V_R$ is the voltage ratio, $B = V_S/I_R$ is the short-circuit resistance, $C = I_S/V_R$ is the open circuit conductance and $D = I_S/I_R$ is the current ratio. Equation (1) may be written in a matrix form, as shown in Equation (2) resulting in the standard transmission line model, where the matrix ABCD is the power transfer characteristics (characteristic impedance) of the transmission line.

$$\begin{bmatrix} V_S \\ I_S \end{bmatrix} = \begin{bmatrix} A & B \\ C & D \end{bmatrix} \begin{bmatrix} V_R \\ I_R \end{bmatrix} \quad (2)$$

Definition 1 (N Node Power Grid):

In one example, consider a power grid with N nodes, where some nodes are connected to other nodes with power lines. In this example, let $N_i$ be the neighboring nodes connected to node i of the power grid; let $(V_{i,j}, I_{i,j})^T$ be the (voltage, current) measurement at bus i on the line that takes power from bus j to bus i for $i \neq j$ and $i,j \in N_i$ and $(V_{i,j}, I_{i,j})^T = (0,0)^T$, otherwise; let $$x_{i,j} = \begin{bmatrix} A_{i,j} & B_{i,j} \\ C_{i,j} & D_{i,j} \end{bmatrix}$$

be the power transfer matrix for bus i on the from bus j to bus i for $i \neq j$ and $i,j \in N_i$ and $$x_{i,j} = \begin{bmatrix} 0 & 0 \\ 0 & 0 \end{bmatrix},$$

otherwise; let $$s_{i,j} = \begin{bmatrix} V_{i,j} \\ I_{i,j} \end{bmatrix}$$

be the state vector contribution to the state of node i due to the power line from node j to node i for for $i \neq j$ and $i,j \in N_i$ and $(0,0)^T$, otherwise; and let the state of bus i be denoted by $s_i = [s_{i,1}, \ldots s_{i,n}]$.

In this example, the global power transfer characteristics (characteristic impedance) of the N node grid is $GPTC_{N \times N} = [x_{i,j} \times x_{i,j}]_{N \times N}$; the global power transfer matrix is $GPTM_{N \times N} = [s_{i,j} \times x_{i,j}]_{N \times N}$; and the Global Voltage-Current Matrix $$GVI_{N \times N} = \begin{bmatrix} V_{i,j} \\ I_{i,j} \end{bmatrix}_{N \times N}.$$

Definition 1 has the following consequences stated in Lemma 1 (below).

Lemma 1:
1. $x_{j,i} = x_{i,j}^{-1}$
2. $GPTM = GPTC \times GVI$

B. An Example

Figure 4:
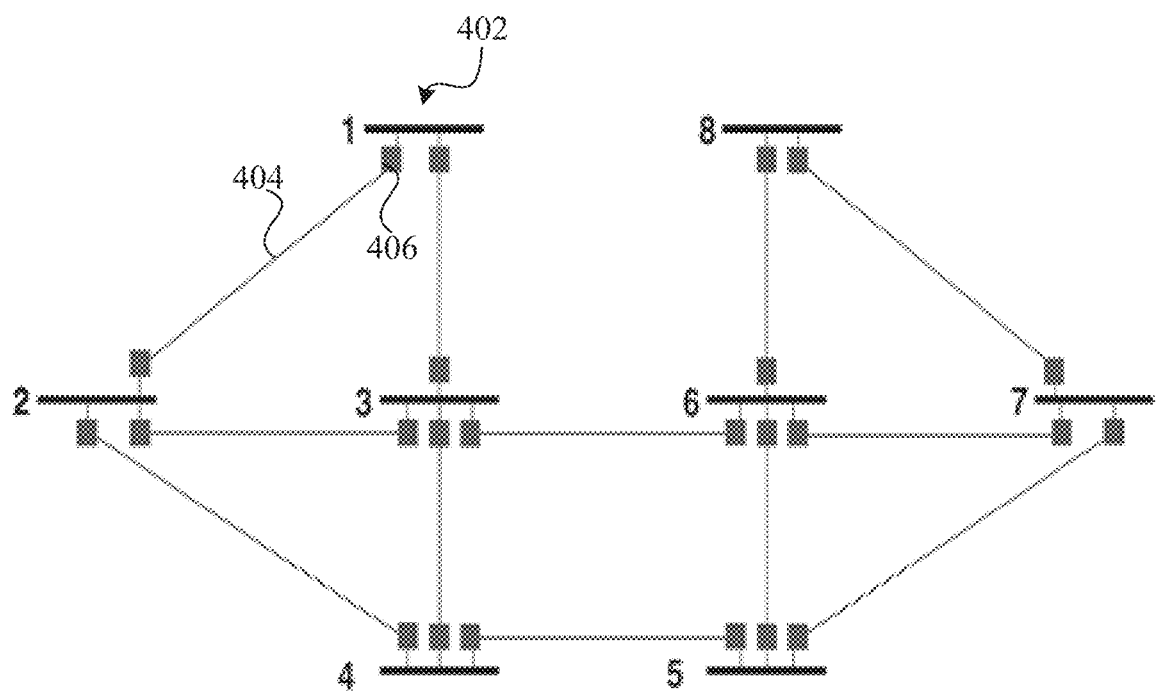
FIG. 4 is an exemplary microgrid, according to one aspect of the present disclosure.

Referring now to FIG. 4, consider the 8-bus power grid example shown in the present embodiment, where each node 402 (only labeled once for simplicity) is identified by its number and the connecting transmission lines 404 (only labeled once for simplicity) identified by the buses 406 (only labeled once for simplicity) they connect. In the present embodiment, the transmission line from bus 1 to bus 2 is identified as (1,2). Using Equation (2), relative states between bus 4 and its neighbors (bus 2, 3, 5) may be determined, as shown in Equation (3).

$$\begin{bmatrix} V_{4,2} \\ I_{4,2} \end{bmatrix} = \begin{bmatrix} A_{4,2} & B_{4,2} \\ C_{4,2} & D_{4,2} \end{bmatrix} \begin{bmatrix} V_{2,4} \\ I_{2,4} \end{bmatrix} \quad (3)$$

$$\begin{bmatrix} V_{4,3} \\ I_{4,3} \end{bmatrix} = \begin{bmatrix} A_{4,3} & B_{4,3} \\ C_{4,3} & D_{4,3} \end{bmatrix} \begin{bmatrix} V_{3,4} \\ I_{3,4} \end{bmatrix}$$

$$\begin{bmatrix} V_{4,5} \\ I_{4,5} \end{bmatrix} = \begin{bmatrix} A_{4,5} & B_{4,5} \\ C_{4,5} & D_{4,5} \end{bmatrix} \begin{bmatrix} V_{5,4} \\ I_{5,4} \end{bmatrix}$$

In one embodiment, the 8-bus grid in the power grid example in FIG. 4 may be modeled as an 8×8 matrix Q based on the grid GPTM, or any appropriately sized matrix.

C. The Control Model

In one embodiment, at the bus level, control objectives of the power system can be achieved using local control functions without collaborating with the other nodes in the grid or in coordination with neighboring nodes to optimize the grid's global functions. In various embodiments, the former may be classified as primary control functions and the latter as secondary control functions. In certain embodiments, control functions like over-current protection and over-voltage protection are considered primary control functions, while functions like economic dispatch, self-healing, load management, and power flow optimization are considered secondary control functions. Both primary and secondary control objectives depend on measurements obtained from sensors that are either locally and/or remotely over the network to determine the present state of the system in order to generate appropriate control decisions.

Definition 2 (Node i with $M_i$ Neighbors):

In one embodiment, consider a node i with $M_i$ neighbors, where a neighbor of node i is a node with direct physical connection to node i. In this embodiment, the local power transfer characteristics vector of the bus i is $LPTC_i = [x_{i,j}: \{j \in M_1 \wedge x_{i,j} \in GPTC\}]_{1 \times M_i}$; the local voltage-current state vector of the bus i is $LVI_i = [s_{i,j}: \{j \in M_1 \wedge s_{i,j} \in GVI\}]_{1 \times M_i}$; and, the remote voltage-current information vector $RVI_i = [s_{j,i}: j \in M_i \wedge s_{j,i} \in GVI]_{M_i \times 1}$ is the line state information of all $M_i$ neighboring buses sent over the network to bus i.

Furthermore, in this particular embodiment, assume a measurement model $z = h(r) + e$, where z is the measured value, r is the actual value being measured, $h(\cdot)$ is a nonlinear scalar function that models the sensing device, and e the error introduced due to the inaccuracy of the sensing device. In this embodiment, $Z_{i,j}^V = h_{i,j}^V(s_{i,j}^V) + e_{i,j}^V$ is the voltage measurement of line $\{i,j\}$ at bus i, and $Z_{i,j}^I = h_{i,j}^I(s_{i,j}^I) + e_{i,j}^I$ is the current measurement of line $\{i,j\}$ at bus i. Thus, $Z_{i,j} = [Z_{i,j}^V, Z_{i,j}^I]$. Furthermore, in this embodiment, $Z_{LVI_i} = [Z_{i,j}: \{j \in M_i\}]_{1 \times M_i}$ is the local measurement vector, and $Z_{RVI_i} = [Z_{j,i}: \{j \in M_i\}]_{M_i \times 1}$ is the remote measurement vector.

Definition 2 has the following consequences stated in Lemma 2 (below).

Lemma 2:

In one embodiment, $LVI_i^V$ may be the voltage state at Bus i, and $[s_{i,j}^V: \{j \in M_i\}]_{1 \times M_i}$ the corresponding voltage state at each line attached to i. Then, $LVI_i^V = s_{i,1}^V = s_{i,2}^V = \ldots = s_{i,M_i}^V$, and $LVI_i^I$ may be the current state at Bus i, and $[s_{i,j}^I: \{j \in M_i\}]_{1 \times M_i}$ the corresponding current state at each line attached to i. Thus $LVI_i^I = \Sigma_{j=1}^{M_i} s_{i,j}^I = 0$, and $RVI_i = LPTC_i \times LVI_i$.

In various embodiments, $LPTC_i$ represents the power transfer characteristics of all transmission lines originating at bus i to all $M_i$ neighboring buses, and vector $LVI_i$ represents the state of the corresponding line at bus i. In one embodiment, for decentralized control, each node may make control decisions independently. Thus, the decentralized control system may be represented using the full-state feedback model given in Equation (6).

$$Z_{LVT_i}[t+1]=[LPTC_i-\vec{d}_ik_i]\cdot[Z_{LVT_i}[t]] \quad (6)$$

In one embodiment, in Equation (6), $Z_{LVT_i}[t+1]$ is the expected new state vector, $Z_{LVT_i}[t]$ is the current state, $k_i$ is the $i^{th}$ state feedback gain for $i \in M_i$, and the vector $\vec{d}_i=[a_{i,j};j \in M_i]$ is the control gain. Although node i makes control decision independently, it may estimate the state of its neighbors as $LPTC_i \times LVI_i$ and hence may achieve locally optimal primary control. In certain embodiments, the primary control objectives of power systems are achieved using local control functions without collaborating with the neighboring nodes in the grid. Therefore, the results of primary control functions may not be optimal for the microgrid as a whole. In particular embodiments, primary control functions rely only on the state measurements from local sensors. Therefore, the control decision is the ML dimensional vector of control actions $\vec{a}_i$ made by bus i about the $K^{th}$ primary control function $f_K^p$ can be modeled as:

$$\vec{d}_k=f_k^p(Z_{LVT_i},\vec{C}_K) \quad (7)$$

In Equation (7), $f_k^p$ is the $k^{th}$ multi-objective primary control function and $\vec{C}_k$ is the constraint vector for the $k^{th}$ control objective. Conversely, the secondary control objectives for the smart grid is to achieve optimal control solutions for the traditional power management functions while enabling other functions such as economic dispatch, self-healing, load management and power flow optimization. Secondary control functions may rely on the interactions between the distributed nodes over a communications network and can be modeled as:

$$\{\vec{a}i,\vec{a}\,i^{ext}\}=f_k^s(Z_{LVT_i},Z_{RVT_i},\vec{C}_k) \quad (8)$$

In one embodiment, in Equation (8), $\vec{a}_i^{ext}=[a_{i,j}^{ext};j \in M_i]_{1 \times M_i}$ is the control decision originating from node i transmitted to be enforced by neighboring nodes, $f_k^s$ is the $k^{th}$ multi-objective secondary control function, and $\vec{C}_k$ is the constraint vector for the $k^{th}$ control objective. In various embodiments, $C_k$ abstracts many traditional constraint equations. A control decision $\vec{a}_i^{in}$ may originate from neighboring nodes and be enforced locally at node i, in which case:

$$\vec{a}_i=f_k^{in}(\vec{a}_k^{in},\vec{C}_k) \quad (9)$$

In one embodiment, the function $f_k^{in}$ generates the corresponding local control decision $\vec{a}_i$ after evaluating $\vec{a}_i^{in}$ a against the constraint vector $\vec{C}_k$ for the $k^{th}$ control objective. Examples of these functions are described below in Section II-A (Fault Identification) and Section II-B (Service Restoration) for an over-current protection function (primary $f_K^p$ function) and a self-healing function (i.e. a secondary $f_K^s$ function) respectively.

D. The Communications Model

In one embodiment, the SOCOM is a lightweight asynchronous messaging platform designed for decentralized automation and control of smart microgrids. In a particular embodiment, the SOCOM runs as an overlay network in between the smart microgrid automation functions and the communications network infrastructure as shown in FIG. 1.

The overlay network layer may be structured to mirror the physical power system (microgrid bus network), where each node has a bus controller (e.g., an IED) that communicates only with its physically connected peers. In various embodiments, the SOCOM uses three major protocols: The Resource Discovery Protocol (RDP), the Control Request Protocol (CRP), and the Status Update Protocol (SUP). In a particular embodiment, the SOCOM has a security layer that provides communication confidentiality, integrity, and authentication and a TCP/IP wrapper layer that provides address resolution. In some embodiments, using these protocols, bus controllers (IEDs) in the microgrid can locate resources, update their status, and initiate control operations in response to optimization objectives in a logically-decentralized and secure way. The three protocols are described in greater detail below.

1) The Security Layer

In one embodiment, the security layer provides encryption, authentication, and integrity validation for messages exchanged between bus controllers in the network. In various embodiments, the security layer uses an off-line certificate authority (CA) to issue elliptic curve based X.509 certificates to bus controllers. In particular embodiments, each bus controller has a hard-coded (permanent) private key d and public key H pair used to establish symmetric encryption keys with peer buses through the ephemeral elliptic curve Diffie-Hellman (ECDHE) key exchange process. In certain embodiments, the private key d is a random integer from $\{1, \ldots, n-1\}$, where n is the order of the elliptic curve subgroup. According to various aspects of the present disclosure, the public key H is the point H=dG, where G is the generator or base point of the subgroup.

Key Generation:

In one embodiment, each bus controller generates a temporal private/public key pair (d', H') for each session. In various embodiments, the bus controllers use the ephemeral elliptic curve Diffie-Hellman (ECDHE) protocol to generate symmetric session keys. In particular embodiments, the process is described below using two bus controllers $b_1$ and $b_2$ with permanent private/public key pairs $(d_1, H_1)$ and $(d_2, H_2)$. In various embodiments, $b_1$ and $b_2$ generate private/public session key pair $(d'_1, H'_1=d_1G)$ and $(d'_2, H'_2=d_2G)$ respectively; $b_1$ computes hash HASH$\{H'_1\}$, signs the hash $d_1\{HASH\{H'_1\}\}$ and sends $\{d_1\{HASH\{H'_1\}\}, H'_1\}$ to $b_1$, and similarly $b_2$ sends $\{d_2\{HASH\{H'_2\}\}, H'_2\}$ to $b_1$; $b_1$ verifies the signature $d_2\{HASH\{H'_2\}\}$ and computes the secret S=$d'_1H'_2$, and $b_2$ verifies $d_1\{HASH\{H'_1\}\}$ and computes S=$d'_2H'_1$. S is the same for both $b_1$ and $b_2$ since S=$d'_1H=d'_1(d'_2G)=d'_2(d'_1G)=d'_2H'_1$; and both $b_1$ and $b_2$ computes the session key k=HASH$\{S\}$.

Encryption, Authentication, and Integrity:

In one embodiment, once k (session key) is computed, a symmetric encryption algorithm is used for encryption. First, the keyed-hash message authentication code (HMAC) is used to ensure message integrity by computing HMAC$_k\{m\}$ over the entire message m. Then, the message m together with HMAC$_k\{m\}$ is encrypted m=$E_k\{m,$ HMAC$_k\{m\}\}$. In one embodiment, authentication is implicitly implied in k since only $b_1$ and $b_2$ know k.

2) The Resource Discovery Protocol (RDP)

In certain embodiments, RDP is a gossip-based protocol used to locate resources within the smart microgrid, where a resource may be an energy source, a storage component, an electric load, or any other component that may provide, transform, or consume energy. In various embodiments, nodes in the grid are kept up to date whenever resources are added or removed from the microgrid or as operating states change, making Gossip-like protocol desirable.

In one embodiment, buses in the smart microgrid learn about available resources by exchanging RDP messages with directly connected peers using the RDP algorithm (Algorithm 1 shown in FIG. 24). In various embodiments, bus controllers support RDP functionality by maintaining a table of known resources, as well as associated routing information. In particular embodiments, upon receipt of an RDP message, the bus controller checks: 1) if the resource is newly discovered (i.e. if the resource id is not found in the resource table), then add the resource information to the resource table; 2) if this is a newly discovered path (i.e. if the resource id is contained in the resource table but reported by another bus), then add resource information to the resource table; 3) if this is a better path (i.e. if this is a known resource from a known bus but the bus count of the resource is lower), then update the resource information in the resource table; and 4) if this is a newer message (i.e. if this is a known resource from a known path with an equal bus count but the timestamp is more recent) due to a change in the operating conditions of the resource, then update the resource information in the resource table.

The RDP message format and field description are shown in FIG. 6(a) and the Table III shown in FIG. 15, respectively.

In various embodiments, one fundamental difference between route discovery protocols like the open shortest path first (OSPF) and the RDP routing is that OSPF uses flooding based on multicast addressing, while RDP uses flooding based on peer-to-peer addressing. In one embodiment, in multicast addressing, nodes within the same broadcast domain may receive the same message multiple times due to the continuous rebroadcasting of the message until convergence is achieved. As a result, messages may be sent redundantly taking up significant bandwidth on the medium, decreasing performance of the network, and increasing contention and overall noise level which may eventually lead to dropping messages. In a particular embodiment, in peer-to-peer addressing, messages are sent using the unicast address of peers. Therefore, messages are not sent redundantly making peer-to-peer based flooding more efficient.

3) An Example Application of RDP

Figure 5:
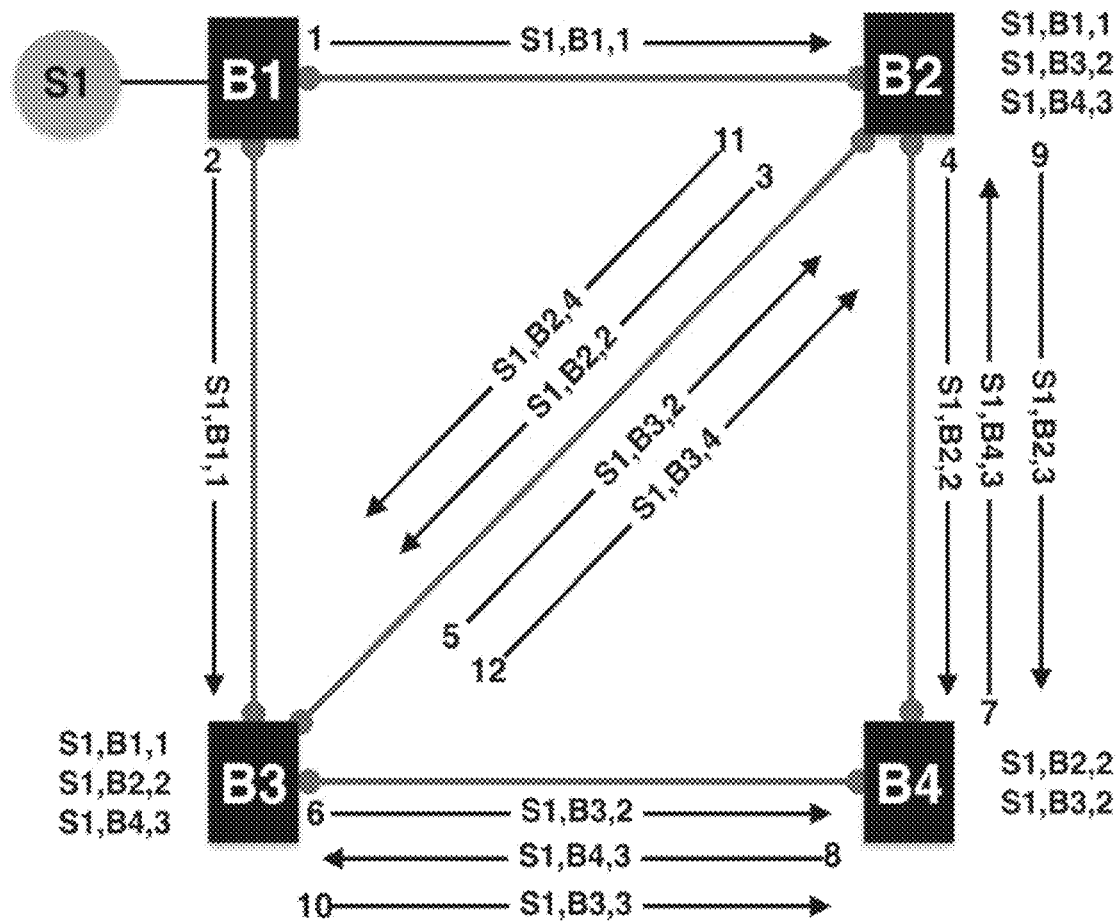
FIG. 5 is an exemplary resource discovery protocol diagram, according to one aspect of the present disclosure.

In one embodiment, the RDP message routing process is illustrated using the triple (resourceID, srcBus, busCount) on the 4-bus example given in FIG. 5. In one embodiment, assume that S1 is a resource directly connected to bus B1 as shown in FIG. 5.

Step 1:

B1 creates an RDP message ⟨S1, B1,1⟩ and sends it to the two directly connected buses B2 and B3 as messages 1 and 2 respectively.

Step 2:

B2 receives ⟨S1, B1,1⟩, S1 is not in its resource table so it adds the path ⟨S1, B1,1⟩ to its resource table, updates the RDP message to ⟨S1, B2,2⟩, and sends it to the two directly connected bus B3 and B4 (but not B1) as messages 3 and 4. Similarly, B3 also receives ⟨S1, B1,1⟩, S1 is not in its resource table so it adds the path ⟨S1, B1,1⟩ to its resource table, updates the RDP message to ⟨S1, B3,2⟩, and sends to the two directly connected bus B2 and B4 (but not B1) as messages 5 and 6.

Step 3:

B2 receives ⟨S1, B3,2⟩; S1 is already in its resource table but from another bus B3 so it adds the path ⟨S1, B3,2⟩ to its resource table, updates the RDP message to ⟨S1, B2,2⟩, and sends it to B4 as message 9. Note, B2 does not send the RDP message back to B1 and B3. Similarly, B3 receives ⟨S1, B2,2⟩; S1 is already in its resource table but from another bus B2 so it adds the path ⟨S1, B3,2⟩ to its resource table, updates the RDP message to ⟨S1, B2,2⟩ and sends it to B4 as message 10. B4 receives RDP messages ⟨S1, B2,2⟩ and ⟨S1, B3,2⟩ from B2 and B3 respectively, updates its resource table, and sends it to B2 and B3 as message 7 and 8 respectively.

Step 4:

B2 receives ⟨S1, B4,3⟩, updates its resource table, and sends it to B3 as message 11. B3 drops the message from B2 because it already knows a better path from B2. Similarly, B3 receives ⟨S1, B4,3⟩, updates its resource table and sends it to B2 as message 12. B2 drops the message. Finally, B4 receives ⟨S1, B2,3⟨ and ⟩S1, B3,3⟩ from B2 and B3 respectively but discards the messages because it was not a new source, from a new another bus, or a better path from a known bus.

4) The Control Request Protocol (CRP)

In one embodiment, CRP is a request/response protocol that executes control actions remotely on resources that are directly connected to peer buses. In various embodiments, the CRP may exchange control decisions ($\vec{a}_i^{in}$ and $\vec{a}_i^{ext}$) between buses. For example, a bus controller can request a peer bus controller to connect or disconnect a power line to alter the power flow during a self-healing operation. In a particular embodiment, a bus controller may initiate control actions on remote buses using CRP messages. According to various aspects of the present disclosure, the CRP message may be a control request, control response, or control information message identified by the ControlType field. The resource Type and resourceID field may be used to identify the resource to be controlled. In one embodiment, a bus may send a CRP control information message to specifically request the status information of a resource using the controlInfo field. In various embodiments, the RDP message format and field description are shown in FIG. 6(b) and the Table IV shown in FIG. 16, respectively.

5) The Status Update Protocol (SUP)

In one embodiment, SUP is a unicast protocol that sends and receives bus information between directly connected buses. In various embodiments, the SUP is primarily used to exchange state measurement information ($Z_{LVI_i}$ and $Z_{RVI_i}$) between buses. In certain embodiments, buses exchange their status information using SUP messages sent at predetermined time intervals or immediately when specific bus information changes. In particular embodiments, buses also use the SUP as a keep-alive protocol to indicate that the bus is still active in the network. The SUP message format and field description are shown in FIG. 6(c) and the Table V shown in FIG. 17, respectively.

6) The TCP/IP Protocol Wrapper

In one embodiment, the TCP/IP protocol wrapper encapsulates the SOCOM messages with the appropriate TCP/IP protocol headers for the desired TCP/IP implementation layer. In various embodiments, the wrapper protocol may also provide address resolution for mapping bus IDs to resource locators (application layer), port numbers (transport layer), IP addresses (Internet layer), or MAC addresses (network access layer). In particular embodiments, each bus may maintain an address mapping table for storing network addresses for each neighboring bus. In certain embodiments, at initialization, this table is empty, and each bus uses the network broadcast address to send status messages to neighboring buses. According to various aspects of the present disclosure, in response to receiving the broadcast message from a neighboring bus (specified by the srcBus field), the network address is mapped to the originating bus and used to send subsequent messages.

E. Faults and Attack

1) Cyber and Physical Attacks from a Controls Perspective

Typically, the goal of a power grid attacker is to cause service disruption and/or degrade the performance of automation functions running on the system. Generally, attacks on the smart grid could originate from the cyber or physical components of the system. By exploiting the ubiquitous nature of the physical power infrastructure, a physical attacker may have physical access to some components such as the local sensing/control devices and power system equipment.

Definition 3 (Attack on Node i):

In one embodiment, $Z'_{LVT_i} = Z_{LVT_i} + \Delta Z_{LVT_i}$ is the manipulation of local sensing devices; $k'_i = k_i + \Delta k_i$ is the manipulation of local actuator devices; $Z'_{RVT_i} = Z_{RVT_i} + Z_{RVT_i}$ is the modification of state measurements from neighbor nodes; and $\vec{a}_i^{in'} = \vec{a}_i^{in} + \Delta \vec{a}_i^{in}$ is the modification of control data originating from neighboring nodes.

For example purposes, it is assumed that all physical attacks are local (insider physical attacks) and the security objective of the system is to identify them and localize their impact. In one embodiment, physical attacks on sensors change the local state measurement vector $Z_{LVT_i}$ changing it to $Z'_{LVT_i}$, altering the resulting control equation from Equations (7) and (8) to (11) and (12) respectively. In various embodiments, physical attacks on actuators change the state gain vector $k_i$ to $k'_i$, modifying the full-state feedback control Equation (6) to Equation (10). Attacks on a local node can have cascading effects by sending the modified $Z'_{LVT_i}$ and $\vec{a}_i^{out'}$ to neighboring nodes.

$$Z'_{LVT_i}[t+1] = \{LPTC_i + \vec{a}_i k'_i\} Z'_{LVT_i}[t] \quad (10)$$

$$\vec{a}'_i = f_K^P(Z'_{LVT_i}, C_K) \quad (11)$$

$$\{\vec{a}'_i, \vec{a}_i^{ext'}\} = f_K^s(Z'_{LVT_i}, Z_{RVT_i}, \vec{C}_K) \quad (12)$$

Cyber-attacks generally originate from outside a local node, and embodiments of the present system are implemented and tested such that cyber/network attacks originate from the remote nodes. In various embodiments, one security advantage of decentralized control is that control command messages are not globally visible in the communications network. Therefore, the attacker can modify the state measurements $Z_{RVT_i}$ (state estimation attacks) and control vector $\sim a_i^{in}$ (command injection attacks) obtained from neighbor nodes over the communications network. In certain embodiments, cyber-attacks alter the remote state measurement vector $Z_{RVT_i}$ to $Z_{RVT_i} 0_i$ and control decision $\sim a_i^{in}$ to $\sim a_i^{in} 0$ obtained from neighboring buses over the network. This results in the altering of the secondary control Equation (8) to Equation (13) and altering the local control decision as shown in Equation (14).

$$\{\vec{a}'_i, \vec{a}_i^{ext'}\} = f_K^s(Z_{LVT_i}, Z'_{RVT_i}, C_K) \quad (13)$$

$$\vec{a}'_i = f_K^{in}(\vec{a}_i^{in'}, C^k) \quad (14)$$

In one embodiment, another possibility is to launch a coordinated attack where attackers in unison exploit the physical and cyber vulnerabilities of the grid contemporaneously. Generally, the main goal of such an attack is to maximize the impact of the cyber-attack by exploiting any combination of the physical and cyber-attacks discussed above in a coordinated way to achieve and maximize cascading failures.

2) Faults

In one embodiment, power system equipment and devices may develop faults during operations. In various embodiments, these faults may cause abnormal current and voltage behaviors that may eventually lead to power failures. In particular embodiments, faults could be induced by natural phenomena like lightning strikes, trees falling on transmission lines, and animal contact. In certain embodiments, power system equipment may show signs of impending faults; moisture, overheating, vibration, and voltage surges may precede transformer insulation deterioration fault. According to various aspects of the present disclosure, power systems may be equipped with sensors in addition to voltage and current sensors that measure properties like moisture, temperature, and vibrations of the equipment and keep track of the operating conditions of the equipment. In general, faults behave similar to physical attacks on power system equipment, but using a combination of sensors mentioned above a historical profile of the equipment behavior may differentiate faults from physical attacks.

II. Self-Healing

In one embodiment, self-healing functions may allow the system to recover from power failures due to disturbances (faults and/or attacks) on the microgrid originating from either the physical system or the communications network. Accordingly, the present disclosure discusses a self-healing function in an 11-bus single-phase microgrid system leveraging an overlay communication model. In particular embodiments, the self-healing function reconfigures the switchgear configuration of buses in the power grid to redirect power flow to affected buses after a power failure event. In various embodiments, the 11-bus single-phase microgrid includes three power sources connected to buses B1, B2, and B3 respectively and five load buses (B5, B6, B9, B10, and B11). In certain embodiments, the microgrid is configured to meet the IEEE N-1 Secure requirement for a resilient power grid. According to various aspects of the present disclosure, N-1 secure system design ensures that a failure of one node or link does not result in widespread cascading failures. In certain embodiments, the self-restoration function includes the fault identification and service restoration components described in Sections II-A and Section II-B, respectively.

A. Fault Identification

In one embodiment, the system may identify power failures resulting from faults in the power transmission lines that connect buses in the microgrid. In various embodiments, faults in power transmission lines may be caused by a number of events such as tree branches falling on power lines, severe weather conditions, or animals' interference causing the power line to open circuit (break) or short circuit. In particular embodiments, power lines are equipped with protective relays that trip circuit breakers upon detecting a fault. According to various aspects of the present disclosure, the system is configured to include (or behave as if) these relays that detect faults and trigger breakers in response to faults. In certain embodiments, the triggering of these protective relays may result in the power failures affecting some sections (buses) of the microgrid causing unusually low bus voltages. For example, consider an over-current protection function $f^p_{ocp}$ (15) that detects high current values due to a short circuit fault and opens a protective circuit breaker.

Definition 4 (Over-Current Protection on Line {Ij}):

In one embodiment, $Z_{LVI_{i,j}}^I = h(s_{i,j}) + e_{i,j}$ is the current measurement of transmission line {i,j} at node i; $Z_{LVI_i}^V = h(s_i) + e_i$ is the voltage measurement at node i; $I_{i,j}^O$ is the over-current threshold for the transmission line {i,j}; $a_{i,j} = \{0,1\}^1$ is the local circuit breaker control decision at node i for transmission line {i,j}); $a_{i,j}=0$ indicates an open and $a_{i,j}=1$ indicates a close switchgear control decision; and $C_{ocp} = \{Z_{LVI_{i,j}}^I \leq I_{i,j}^O\}$ is the constraint on the over-current protection function:

$$a_{i,j} = f_{ocp}^p(Z_{LVI_{i,j}}^I, C_{ocp})$$

$$a_{i,j} = 0 \Rightarrow Z_{LVI_{i,j}}^I > I_{i,j}^O$$

$$a_{i,j} = 1 \Rightarrow Z_{LVI_{i,j}}^I \leq I_{i,j}^O$$

According to various aspects of the present disclosure, using a combination of local values $Z_{LVI_{i,j}}^I$ and $a_{i,j}$, the system may identify three possible line connection states; active state, inactive state, and faulty state using Table VI shown in FIG. 18. The "Connection" column in Table VI identifies if the line is either connected or disconnected by the bus controller to meet the power flow objectives of the microgrid. In one embodiment, a power failure occurs at bus i when $Z_{LVI_{i,j}}^V < V_{fail}$, where $V_{fail}$ is the bus fail voltage. In various embodiments, this could result from the protection function's control actions either from the local bus or as a side effect from a remote bus. Generally, the over-current threshold may vary based on system configurations; however, in one embodiment, the over-current threshold may be set to about 125% of a rated current for the system.

B. Service Restoration

In one embodiment, the system may generate a control vector for modifying the bus switchgear configurations to connect or disconnect transmission lines, thereby altering the flow of power.

Definition 5 (Self-Healing):

In a particular embodiment, consider a micro-grid with consumer loads LD and power generators GEN connected at designated buses. In this embodiment, $LD_u$ is the consumer load directly connected to the $u^{th}$ bus; $GEN_v$ is the power generator directly connected to the $v^{th}$ bus; $I_{u,v}^{max}$ is the maximum current the transmission line {u,v} can safely support; and $V^{min}$ and $V^{max}$ is are minimum and maximum voltages allowed for all buses in the grid.

In one embodiment, if bus i is a P-Q bus (load bus) of load $LD_i$ with neighboring bus j, then the restoration strategy would be determined based on the following restoration constraints.

Restoration Constraints ($\vec{C}_{heat}$):
Assume power is being restored to bus i from bus j $$LD_i \leq \min \sum_{k=1}^{v} GEN_k^{avail} \quad (18)$$

$$Z_{LVI_{i,j}}^I < I_{i,j}^{max} \quad (19)$$

$$V^{min} \leq Z_{RVI_i}^V \leq V^{max} \quad (20)$$

$$V^{min} \leq Z_{LVI_i}^V \leq V^{max} \quad (21)$$

In one embodiment, Equation (18) is power source constraint, where $GEN_k^{avail}$ is the available generating capacity of the $k^{th}$ bus. In certain embodiments, Equation (19) is the line constraint and Equation (20) is the voltage constraint that may be true before the healing function is called. In some embodiments, Equation (20) and (21) may also be true after the restoration operation completes. According to various aspects of the present disclosure, the goal of the healing function $f_{heal}^s$ is for each bus i to independently generate a vector pair $\{\vec{a}_i, \vec{a}_i^{ext}\}$ that restores power satisfying the constraint $\vec{C}_{heat} = [(18), (19), (20), (21)]$ stated above. This is achieved using the heuristics discussed in Section II-B1, immediately below.

1) Healing Function Heuristics

In one embodiment, periodic RDP messages allows bus controllers in the microgrid to learn the energy sources in the microgrid and their available capacity, as demonstrated in FIG. 5. In various embodiments, each bus controller also learns the distance to each source (bus count) from each directly-connected bus and other relevant source information that can be passed using RDP messages. In certain embodiments, when a power failure occurs, the bus enters the FAIL state and calls the self-healing algorithm (Algorithm 2 shown in FIG. 25) to generate a new grid configuration that restores power to the bus. In some embodiments, the self-healing algorithm (Algorithm 2), when called, puts the bus in a RECOVER state and disconnects all connected buses (line 10). Furthermore, it may then check for the first neighboring bus with voltage within the normal limits. If such a bus is found, it is added to the inTable list (the inTable holds all candidate neighboring buses) and checked if; (1) the available power sources can support the bus load using the checkLoad( ) function (line 15), and (2) the transmission line can support the bus load using the checkLine( ) function (line 16). In one embodiment, if both the checkLoad( ) and checkLine( ) functions return true, the corresponding $\vec{a}_i$ and $\vec{a}_i^{ext}$ is generated and connection requests are sent to all neighboring buses in the inTable. This process may continue until power is restored or there is no more neighboring bus to check.

C. Restoration with Priority Loads

In one embodiment, the smart grid includes different classes of users: residential, commercial, essential services, critical infrastructure, and utility services. In certain embodiments, some classes of users may be prioritized over others when restoring power after failure. In various embodiments, this is important when part of the grid fails, and the available power is not sufficient to service all users. In a particular embodiment, using the SOCOM model allows buses to identify various load classes and route power accordingly.

In certain embodiments, loads are classified into three categories: Level-i for critical loads, Level-2 for high-priority loads, and Level-3 for low-priority loads. In various embodiments, a bus is labeled based on the load class attached to it so that a critical bus is a bus serving a critical load.

In particular embodiments, using this additional load priority constraint, a modified self-healing Algorithm (3) (as shown in FIG. 26) may allow for prioritizing service restoration based on load class. In various embodiments, when a failure occurs, the affected buses disconnect all attached loads and neighboring buses. Furthermore, using the same process discussed in Algorithm 2, power is restored to the affected buses. In particular embodiments, once power is restored to the bus (load still disconnected), the affected bus(es) sends out periodic (every 5 s) RDP messages indicating the state and priority of the bus load until power is restored to the load. According to various aspects of the present disclosure, for each load class, there is a minimum time delay range that the bus must wait before attempting to connect loads. In one embodiment, for level-1 (Critical), time delay range is 0 to 1 minute, for level-2 (high), it is 2 to 3 minutes and for level-3 (normal), it is 4 to 5 minutes. In various embodiments, each bus randomly chooses a time delay within the time delay range of its class and as soon as the delay elapses, it checks if there are RDP messages from buses with higher load priority. In certain embodiments, if there are no RDP messages with higher priority loads, the load is connected if the available power is sufficient to service the load. In one embodiment, the random time delay sequence is repeated until power is restored to the bus load.

III. The SOCOM Intrusion Detection and Response System (SOCOM-IDS)

In one embodiment, the smart grid consists of automation functions that coordinate the distributed components of the power grid to ensure a reliable, efficient, and safe power delivery. In various embodiments, attacks on the smart grid target the correct operation of these automation functions by corrupting data exchanged over the communications network, and/or attacking physical equipment so that they become unable to work correctly. According to various aspects of the present disclosure, the SOCOM-IDS detects and mitigates these cyber and physical attacks on automation functions and their corresponding processes in the smart grid. In certain embodiments, for the SOCOM-IDS to adequately protect the automation functions, it may understand and monitor both the physical and network system behaviors that define the automation functions. In particular embodiments, the physical system behavior is observed from data obtained from local sensors, and the network behavior is observed from data obtained over the communications network.

A. SOCOM-IDS Objectives

When configuring intrusion detection and prevention systems for decentralized cyber-physical control systems such as the smart grid, at least these three aspects should be considered: data integrity, state integrity, and process integrity. Data integrity ensures that there has been no malicious modification of data as it travels from node to node. In one embodiment, the global system state is estimated using data obtained from various nodes in the system, and the state integrity ensures that the system state estimation is correctly maintained. In various embodiments, the automation functions make control decision based on estimations of the global system state relative to the local states governed by a process. In particular embodiments, the process is viewed as a series of actions and interactions between the physical system, nodes (controllers and IEDs), and the communications network required to implement the automation function. In certain embodiments, the process integrity protects the integrity of processes running in the smart grid.

B. SOCOM-IDS Model

Figure 7:
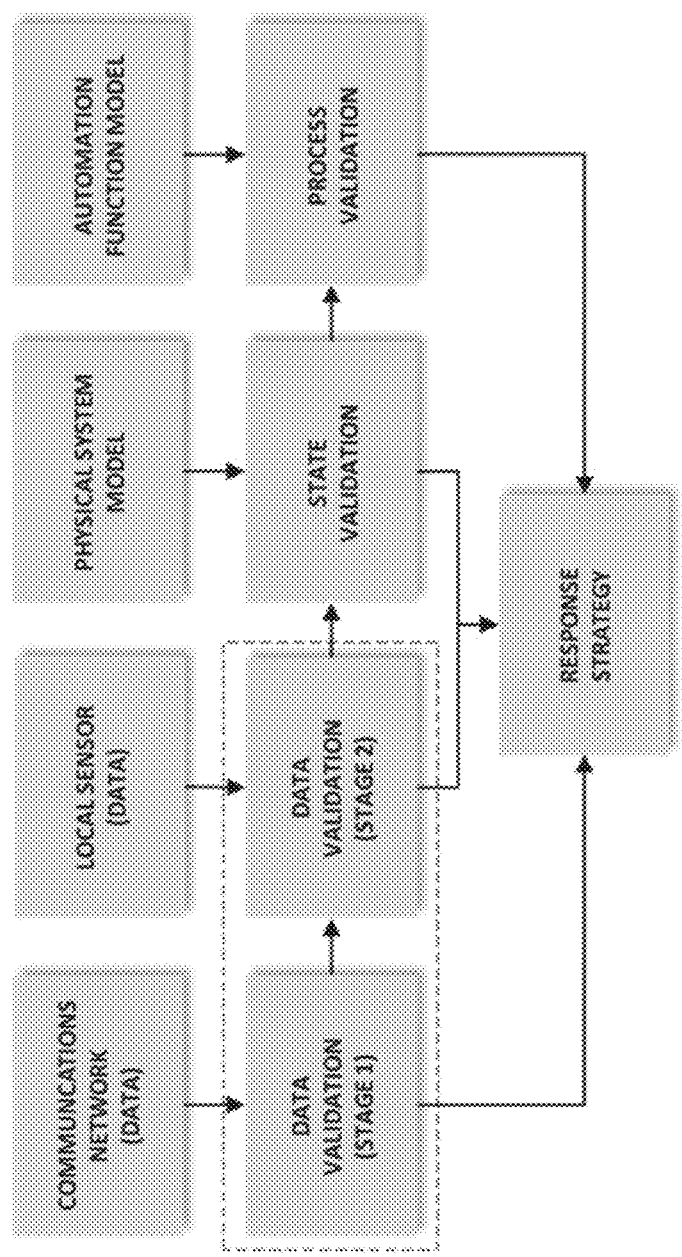
FIG. 7 is an exemplary SOCOM-IDS model diagram, according to one aspect of the present disclosure.

In certain embodiments, the SOCOM-IDS model uses a modular strategy for attack detection and response for minimizing the vulnerability of the microgrid. In various embodiments, the SOCOM-IDS includes three detection modules compartmentalized to run independently of the other modules. In one embodiment, FIG. 7 illustrates the structural layout of the SOCOM-IDS and is described in greater detail below.

1) Data Validation Module

In one embodiment, the data validation module detects false data injected attacks on nodes of the microgrid. In various embodiments, this module includes two parts. In certain embodiments, the Data Validation (Stage 1) uses message authentication code based on cryptography controls to validate the integrity of data received from neighboring nodes. In particular embodiments, Data Validation (Stage 1) is handled at the SOCOM security layer discussed in Section I-D1.

In some embodiments, the Data Validation (Stage 2) uses deep packet inspection techniques to check for voltage and current values that exceed predetermined values. According to various aspects of the present disclosure, the current and voltage properties of bus j can be estimated or predetermined by local measurements done at neighboring bus i. Based on Lemma 2, it is established that $s_{j,i}=x_{i,j}\cdot s_{i,j}$. Therefore, with the line state $LVI_i$ at bus i and it's power transfer characteristics $LPTC_i$, the line state of neighbors of bus i from bus i can be estimated.

Definition 6 (Data Validation):

In one embodiment, consider an example scenario including two neighboring buses i and j. In this example scenario, let $Z^*_{RVI_{i,j}} = x_{i,j} \cdot Z_{LVI_{i,j}} = x_{i,j} \cdot (h(s_{i,j}) + e_i)$ be the line state measurement of bus j estimated at bus i, and let $Z_{RVI_{i,j}} = Z_{LVI_{j,i}} = h(s_{j,i}) + e_j$ be the line state measurement sent over the network from bus j to i under normal operating conditions.

$$Z^*_{RVI_{i,j}} \stackrel{?}{=} Z_{RVI_{i,j}}$$

$$x_{i,j} \cdot h(s_{i,j}) - h(s_{j,i}) = e_j - x_{i,j} \cdot e_i \quad (22)$$

In Equation (22), $e_j - x_{i,j} \cdot e_i$ is the estimation error. Thus, in one embodiment, $|e_j - x_{i,j} \cdot e_i| = |Z^*_{RVI_{i,j}} - Z_{RVI_{i,j}}| < \zeta$, where $\zeta$ is the error detection threshold or estimation error threshold. In various embodiments, Table IX (as shown in FIG. 21) shows the estimation errors under different load conditions obtained from the system simulations. In certain embodiments, the Data Validation (Stage 2) problem can now be represented as a binary decision:

FALSE: $|Z^*_{RVI_{i,j}} - Z_{RVI_{i,j}}| \leq \zeta$

TRUE: $|Z^*_{RVI_{i,j}} - Z_{RVI_{i,j}}| > \zeta$

In one embodiment, the data has been modified if Equation (23) is TRUE. In various embodiments, the data validation module estimates the neighbor's bus voltage magnitudes and phase angle, the branch currents, and the branch's direct and reactive power values from local sensor measurements. In a particular embodiment, these values are compared with the neighbor state measurements obtained over the network, and a potential bad data is detected if the variation exceeds the bad data detection threshold.

In various embodiments, power system measurements are obtained from sensors at discrete time intervals called sample times $t_s$. In some embodiments, when these measurements are sent over the communications network to neighbor buses, they experience time delays due to the digital processing $D_{dp}$, transmission $D_t$, and propagation $D_p$ of the signal. In one embodiment, to account for these delays, the system can be configured so that $t_s > D_{dp} + D_t + D_p$. According to various aspects of the present disclosure, another approach is to have a sliding sample window $t_w = 2nt_s$, where $t_s = (D_{dp} + D_t + D_p)/n$ and n is the number of samples. In the latter approach, each sample is timestamped. When used for bad data detection, the timestamp of $Z_{RVI_i}$ obtained over the network is matched to the corresponding $Z_{LVI_i}$ of a similar timestamp value within $t_w$ (usually the oldest sample). In various embodiments, both approaches require that time be synchronized across all neighboring buses. According to various aspects of the present disclosure, $t_s = 1$ ms because $D_{dp} + D_t + D_p < 1$ ms. The data validation module is further described using Algorithm (4), as shown in FIG. 27.

2) State Validation Module

In one embodiment, the state validation module is an off-line detection system (Algorithm (5), as shown in FIG.

28). In particular embodiments, it is run by all buses when a change in the load or source state of the grid is detected. In certain embodiments, each node estimates the state of the microgrid using information obtained from the SOCOM messages exchanged with neighboring nodes. In some embodiments, the estimated state is evaluated against the constraints and guarding conditions of the modeled physical system. The constraints are obtained from the physical laws that govern electric power systems (Equations (24), (25), (26)). The state validation module is based on three basic laws of electricity (below).

Definition 7 (State Validation):

In one embodiment, consider a bus i with $M_i$ neighbors, where $Z_{RVI_i}^{I \leftarrow in} = [Z_{RVI_{i,j}}^{I \rightarrow out} : \{j \in J \subset M_i\}]_{J \times 1}$ represents current measurements from all neighboring buses bus i is drawing current from, $Z_{RVI_i}^{I \rightarrow out} = [Z_{RVI_{i,k}}^{I \rightarrow out} : \{k \in K \subset M_i\}]_{K \times 1}$ represents current measurements from all neighboring buses drawing current from bus i, and $x_{i,j}^{-1} \cdot Z_{RVI_{i,j}}^{I} - Z_{RVI_{i,j}}^{I}$ is the anticipated line loss (current loss or gain) between line $\{i, 1\}$ observed at bus i. In various embodiments, the sum of currents flowing into a node is equal to the sum of currents flowing out (shown below).

$$\left| \sum_{j=1}^{J} Z_{RVI_{i,j}}^{I \leftarrow in} - \sum_{k=1}^{K} Z_{RVI_{i,k}}^{I \rightarrow out} \right| \leq \beta \text{ where} \quad (24)$$

$$\beta = \left| \sum_{j}^{J} \left( x_{i,j}^{-1} \cdot Z_{RVI_{i,j}}^{I \leftarrow in} - Z_{RVI_{i,j}}^{I \leftarrow in} \right) + \sum_{k}^{K} \left( x_{i,j}^{-1} \cdot Z_{RVI_{i,k}}^{I \rightarrow out} - Z_{RVI_{i,k}}^{I \rightarrow out} \right) \right|$$

and $j \neq k$

Power dissipated by a load is inversely proportional to the voltage and current (P=V*I). In one embodiment, the voltage $Z_{RVI_{i,j}}^{V}$, and current $Z_{RVI_{i,j}}^{I}$ measurements received from bus j should be equal to the estimated branch power $x_{i,j} \cdot Z_{LVI_{i,j}}^{V} * x_{i,j} \cdot Z_{LVI_{i,j}}^{I}$ measured locally at bus i for line $\{i,j\}$ minus estimation error $\Gamma$.

$$x_{i,j} \cdot Z_{LVI_{i,j}}^{V} * x_{i,j} \cdot Z_{LVI_{i,j}}^{I} + \Gamma = Z_{RVI_{i,j}}^{V} * Z_{RVI_{i,j}}^{I} \quad (25)$$

In a closed system, the total power used by the load is equal to the total power drawn from the power source. In various embodiments, each node estimates the total power used by loads in the micro-grid and the total power drawn from all sources using RDP message exchanges.

$$\Sigma_{q=1}^{u} = LD_q + \overline{w} = \Sigma_{r=1}^{v} GEN_r^{used} \quad (26)$$

In Equation (26), $\Sigma_{q=1}^{u} LD_q$ is the sum of all bus loads in the power grid, $\Sigma_{r=1}^{v} GEN_r^{used}$ is the total sum of power generated by all sources in the power grid, u and v are the number of load buses and source buses respectively, and w is the estimated maximum power loss in the grid. In various embodiments, this test helps to detect smart meter tampering class of attacks, where the smart meters have been physically altered or cyber-attacked to give wrong load information.

3) Process Validation Module

In one embodiment, the process validation module is unique for each automation function. In various embodiments, a process is a series of actions and interactions between the physical system components, intelligent controllers (or IEDs) and communications network for implementing an automation function under normal working conditions. In particular embodiments, each automation function has a distinguishable process behavior that is useful in designing security solutions tailored to meet its unique requirements. Algorithm (6), as shown in FIG. 29, describes the process validation module.

Figure 8:
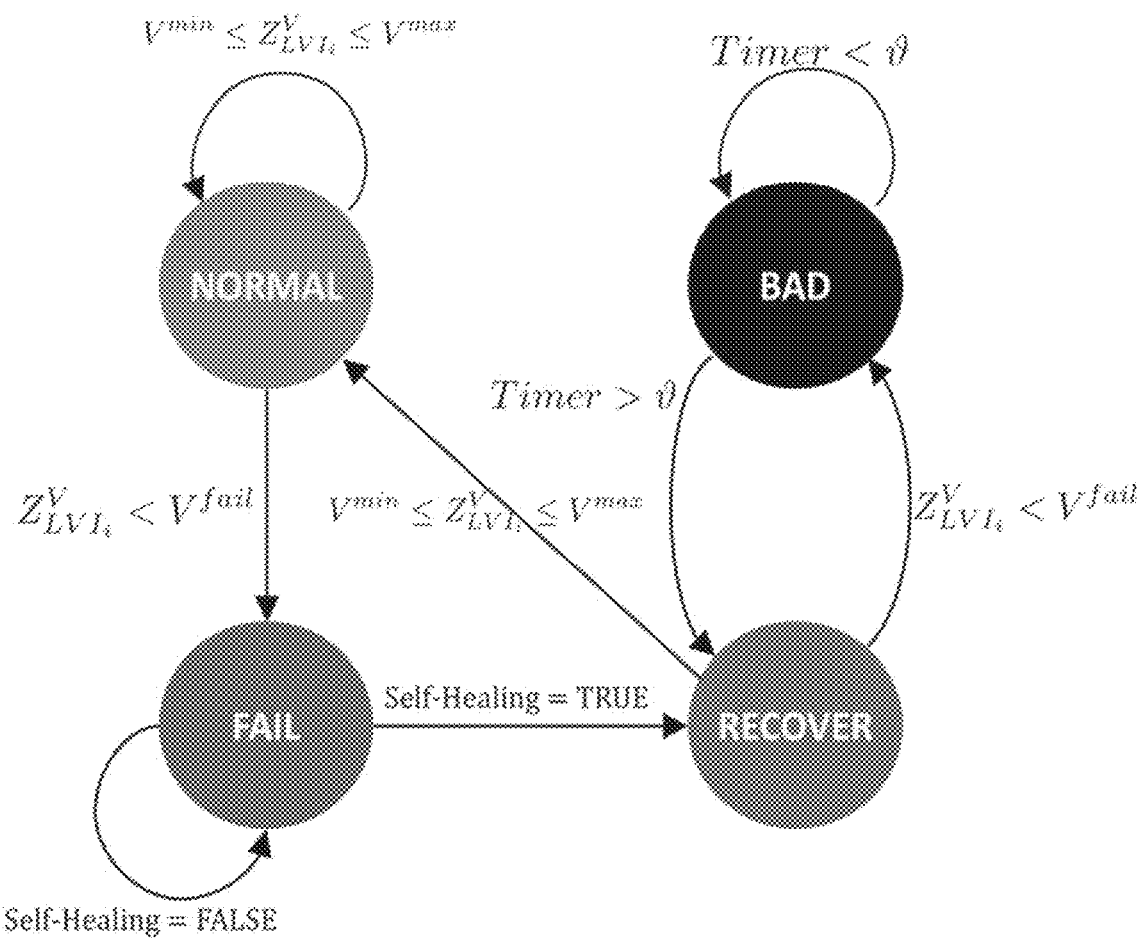
FIG. 8 is an exemplary self-healing state transition diagram, according to one aspect of the present disclosure.

In various embodiments, the self-healing automation function is illustrated by the state diagram shown in FIG. 8. In particular embodiments, the goal of the healing function $f_{heal}$ is to ensure that the failed bus i can independently generate a healing control vector $\vec{a}_i = \{0,1\}^{M_i}$ and $\vec{a}_i^{ext} = \{0,1\}^{M_i}$ that restores power satisfying the constraints given in Equations (18), (19), (20), and (21).

In one embodiment, the healing control vector ai is generated by the failed bus and sent to neighboring buses to change their switchgear device configuration. The self-healing process includes four states (below):

NORMAL—During the normal operating state, the bus continuously monitors its voltage state ($Z_{LVI_i}^{V}$) using local sensors and that of its neighboring nodes $Z_{RVI_i}^{V}$. Under normal condition $V^{min} < Z_{LVI_i}^{V} < V^{max}$ and $V^{min} < Z_{RVI_i}^{V} < V^{max}$.

FAIL—Power lines are enriched with relays that detects faults and trigger circuit breakers in response to faults. The triggering of these protective relays may result in the power failures affecting one or more buses of the microgrid causing $Z_{LVI_i}^{V} < V^{fail}$.

RECOVER—Once a failure occurs, and if the self-healing function is enabled, the affected bus i independently generates a control vector $\vec{a}_i$ and $\vec{a}_i^{ext}$ to control local and neighbor switchgear devices to restore power based on the self-healing algorithm (2).

BAD—The bus enters a bad state if there is no aL and atx solution found that restores power satisfying the self-healing function constraints.

In various embodiments, the self-healing process follows a specific sequence of messages from a failure to service restoration. $SUP_{NORMAL} \rightarrow SUP_{FAIL} \rightarrow RDP \rightarrow CRP_{HEAL} \rightarrow SUP_{NORMAL}$. In the normal state, each bus sends status information to neighboring buses using SUP messages. In one embodiment, when a failure occurs, the affected bus immediately sends an SUP message to its neighboring bus to report this event and stops sending SUP messages. In particular embodiments, the changes in power drawn by the affected load buses triggers RDP messages to be sent by affected source buses to reflect the current power consumption state. If self-healing is enabled, the bus enters the recovering state and calls the self-healing function (Algorithm (2) or (3)). In certain embodiments, the self-healing function computes the healing control vector and sends a CRP message the neighboring bus to implement the new configuration. According to various aspects of the present disclosure, if the power restoration is successful, the bus enters the normal state and restart sending SUP messages.

4) Response Strategy

In one embodiment, once an intrusion is detected, the SOCOM-IDS may stop the attack by performing the following task using Algorithm (7), as shown in FIG. 30: 1) change enforcement layer (changeEnforceLayer( )). SOCOM can run as a MAC layer, network layer, transport layer (UDP), or application layer application. If an intrusion is detected by a node, a change layer SUP message is sent to by the node to all neighbor nodes. The change layer SUP message is then propagated to all nodes; 2) change cryptographic keys (changeEncKey( )). If the intrusion persists, then the node generates new cryptographic keys and initiates a key exchange procedure as discussed in Section I-DI; 3) block communications from compromised node(s) (blockComm( )). If the intrusion persists, it is most likely that the originating node may have been compromised, therefore all subsequent messages from that node is blocked; and 4) disable secondary control functions (disableAuto( )). Discarding network messages that may have adverse effect on secondary control functions. If more than a pre-determined number of neighbor nodes is compromised or the secondary control function is unable to run effectively, then the secondary control function is disabled.

IV. Implementation and Results

A. FPGA Implementation

Figure 9:
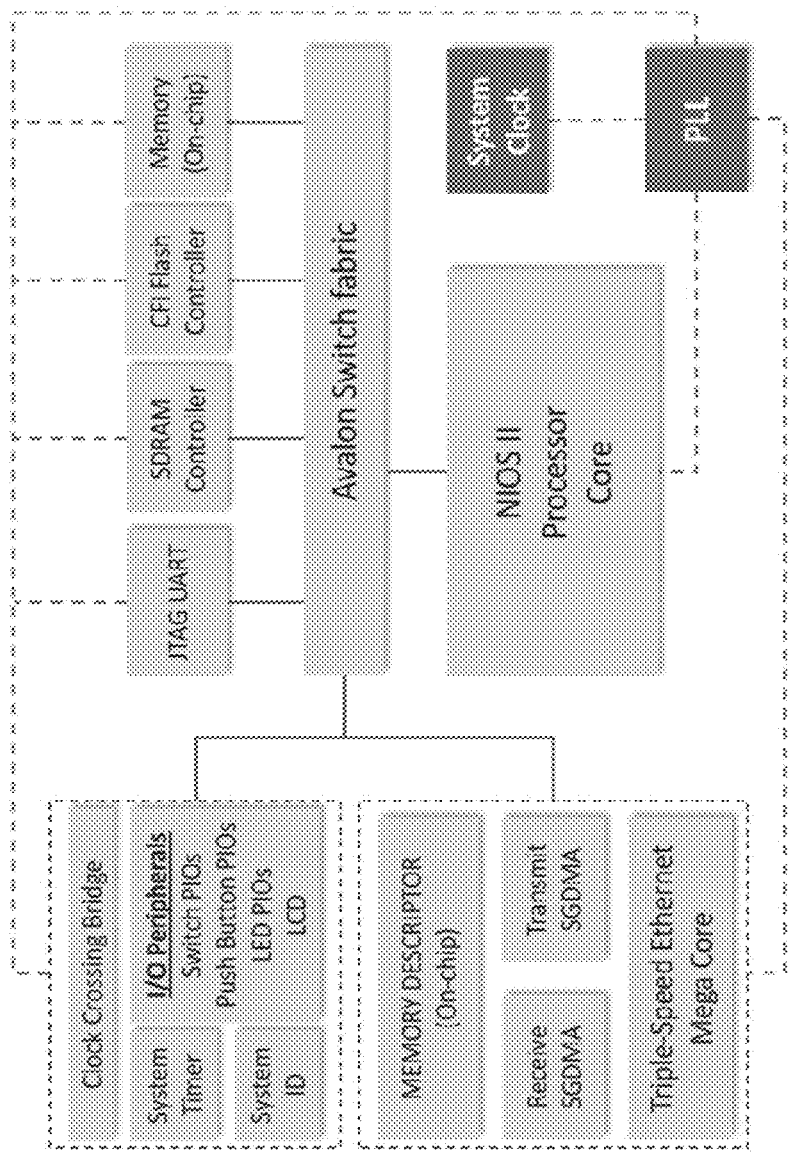
FIG. 9 is an exemplary FPGA block diagram, according to one aspect of the present disclosure.

In one embodiment, the system implementation includes a Cyclone IV-E EP4CE115F29C7 FPGA and Altera DE2-115 Development and Educational Board. FIG. 9 illustrates a block diagram representation of the FPGA system model used for the SOCOM system. The model includes a Nios II processor that runs application programs, a JTAG UART component to support communication between the processor and the host computer, a Triple-Speed Ethernet IP Core to implement the MAC sublayer, a Synchronous dynamic random-access memory (SDRAM) for program code and data, and two scatter-gather direct memory access (SGDMA) controllers for data transmission and receiving functions to and from the MAC sublayer. In various embodiments, the model also includes flash memory to store the MAC and IP addresses and input/output peripherals used as output indicators and control inputs for the bus controller.

B. SOCOM

In one embodiment, the SOCOM network was implemented and tested on the MAC layer, Network layer, and Transport layer (UDP), and the security layer was built using the OpenSSL cryptographic library (crypto). In various embodiments, the elliptic curve cryptographic algorithm used is based on the prime256v1 curve. In particular embodiments, the symmetric encryption and hash functions used are the advanced encryption standard (AES-256) and secure hash algorithm (SHA-256) respectively. In certain embodiments, Table VII (as shown in FIG. 19) shows the average processing times for the RDP protocol at each network layer. According to various aspects of the present disclosure, each bus controller may learn about all three generator buses using the RDP protocol. In some embodiments, if the RDP protocol is not run concurrently for all generators, the network may take approximately 68 messages in 24.18 ms, 27.5 ms, and 30.24 ms, respectively, to converge (the RDP discovery process to complete) as shown in Table VII. In one embodiment, buses nearest to the generator bus (1 bus away) may learn about the generator in approximately 0.784 ms, 0.838 ms and 0.879 ms, respectively, and buses farthest from the generator (3 buses away) learn about the generator in approximately 2.20 ms, 2.22 ms, and 2.26 ms respectively. In certain embodiments, propagation delay in the SOCOM system (or simulated SOCOM systems) is less than 0.04 ms. Table XI (as shown in FIG. 23) shows the average execution time when each protocol was triggered, according to one embodiment.

C. Transmission Line Test Results

In one embodiment, Matlab/Simulink computes the transmission line parameters using the RLC elements; r resistance per unit length ($\Omega$/km), l inductance per unit length (H/km), c capacitance per unit length (F/km), f frequency (Hz), and $l_{sec}$ line section length. In various embodiments, the RLC elements are then computed using the hyperbolic functions below:

$$Z_c = \sqrt{\frac{r + j2\pi fl}{j2\pi fc}} \qquad (27)$$

$$\gamma = \sqrt{(r + 2\pi fl) \times j2\pi fc}$$

In Equation (27), $Z_c$ is the characteristic impedance and $\gamma$ is the propagation constant, according to various aspects of the present disclosure. In one embodiment, implementing a Simulink transmission line model for the SOCOM-IDS required generating an equivalent ABCD model discussed in Equation (2). The ABCD equivalent is obtained using the following equations:

$$A = D = \cos h(\gamma \times l_{sec})$$

$$B = \sin h(\gamma \times l_{sec}) \times Z_c$$

$$C = \sin h(\gamma \times l_{sec})/Z_c \qquad (28)$$

According to various aspects of the present disclosure, Equation (28) and Equation (2) allow for a user to estimate the voltage at bus 1 as $V_1 = AV_2 + BI_2$ and the current as $I_1 = CV_2 + DI_2$ from bus 2. Table VIII (as shown in FIG. 20) shows the values for the transmission line parameters used in exemplary simulations, according to one embodiment.

D. Self-Healing

In various embodiments, the SOCOM system may be tested under the assumption that a failure may occur that affects each bus load. In particular embodiments, simulating the SOCOM self-healing functionality includes configuring all switchgear devices connected to all buses to "OPEN." In one embodiment, configuring the switchgear devices to OPEN allows for a user or system administrator to see how both self-healing algorithms initiate the switchgear configuration from system start-up or in response to a widespread failure. Note that optimal power flow or economic dispatch was not considered in the self-healing process, the constraints used in the self-healing process were discussed in Section II-A.

Figure 10A:
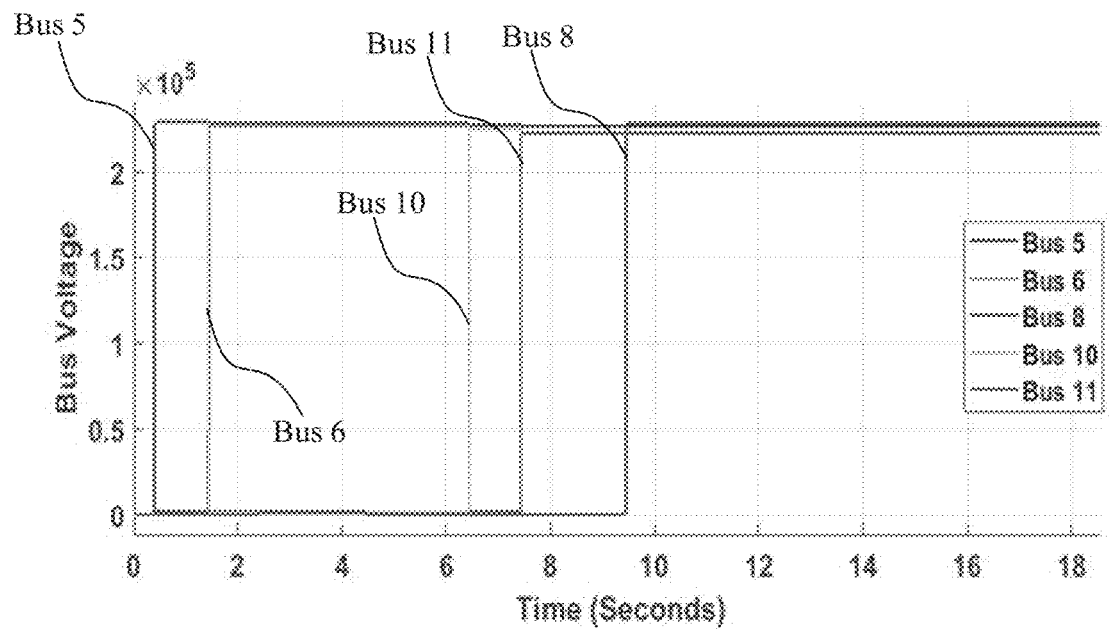
FIG. 10(a) is a graph illustrating exemplary system self-healing timing results, according to one aspect of the present disclosure.

The load priority assignment is shown in Table X, FIG. 22. Bus 5 is implemented on an FPGA device that may rely on a manual toggle-switch to connect or disconnect the load. Thus, the load at bus 5 was perpetually connected during the experiment. In one embodiment, FIGS. 10(a) and 10(c) show the bus voltage adjustments observed during the self-healing process without the load priority constraint. In one embodiment, the self-healing function is run every 5 seconds by the bus after a failure occurs until power is restored. In various embodiments, using this configuration, the buses recover in no specific order and the total time to restore power falls under 10 seconds (worst case). How long the self-healing should wait before activating may depend on user preference. In particular embodiments, some faults such as short-circuits on overhead lines may clear themselves and when they occur so that the power failure might be temporary. In certain embodiments, power systems are equipped with re-closers that automatically restores power after momentary faults. In such cases, a self-healing delay gives ample time for the fault to clear and only activates if the power failure elapses more than a given time interval greater than that of the re-closers.

Figure 10B:
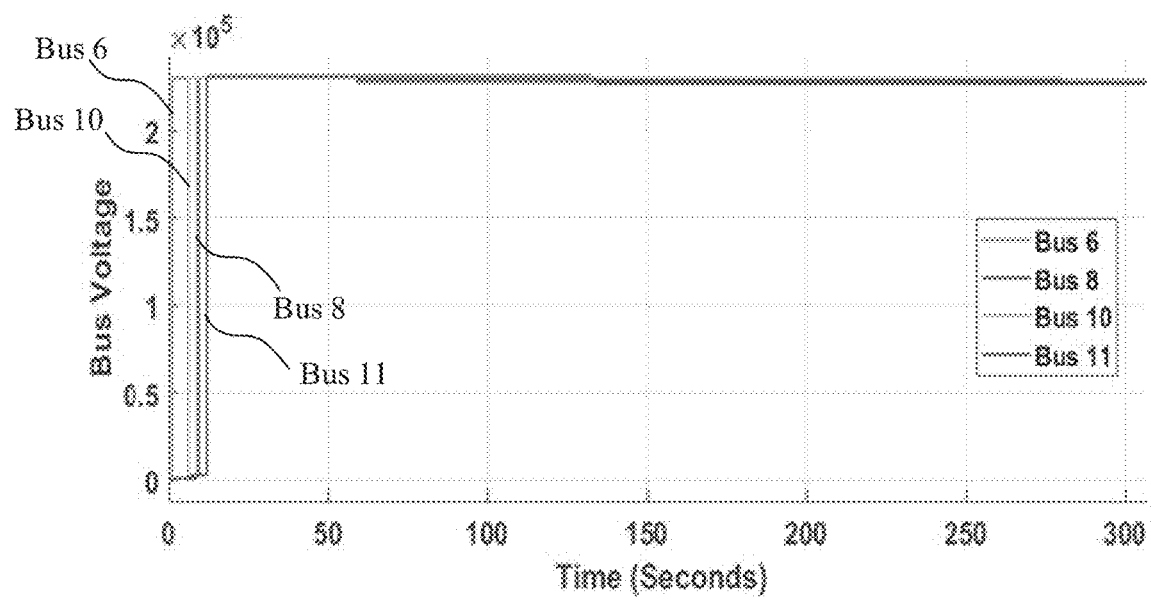
FIG. 10(b) is a graph illustrating exemplary system self-healing timing results, according to one aspect of the present disclosure.
Figure 10C:
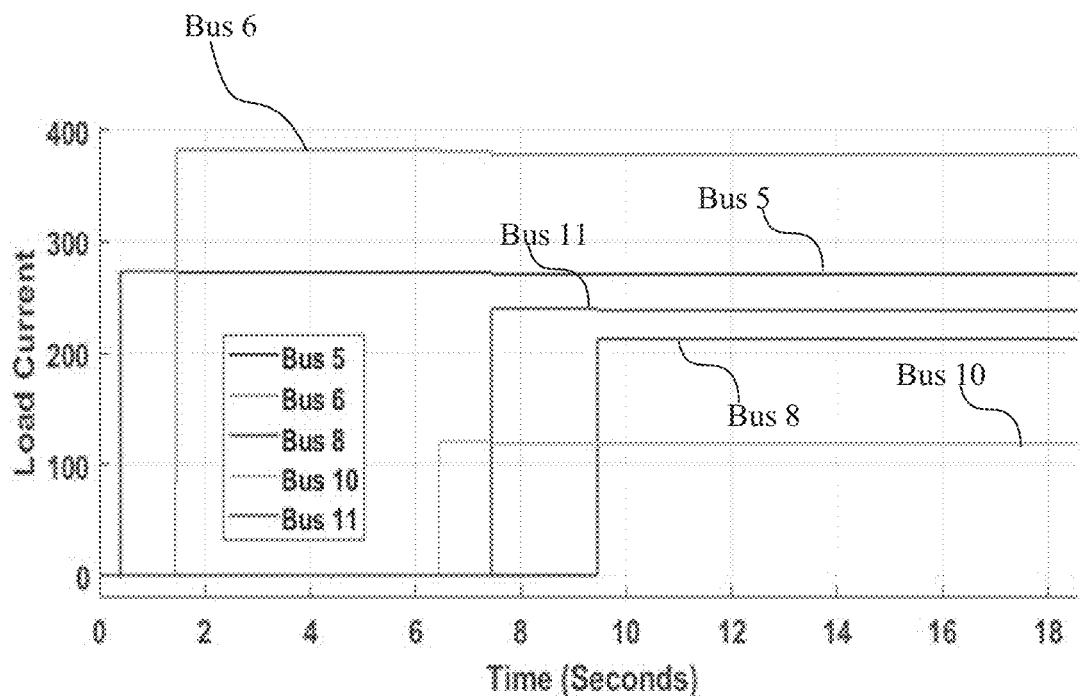
FIG. 10(c) is a graph illustrating exemplary system self-healing timing results, according to one aspect of the present disclosure.
Figure 10D:
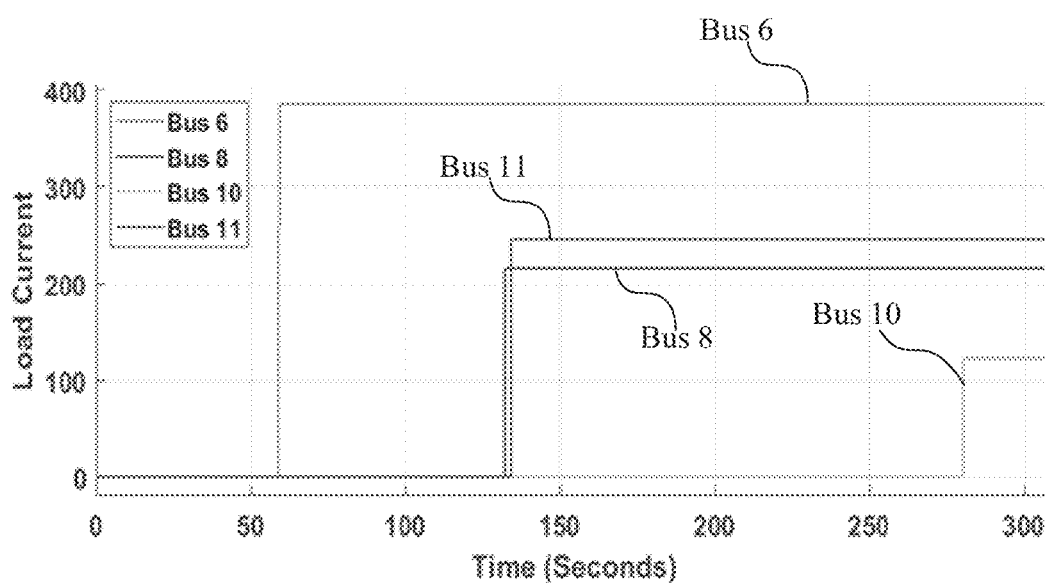
FIG. 10(d) is a graph illustrating exemplary system self-healing timing results, according to one aspect of the present disclosure.

In one embodiment, FIGS. 10(b) and 10(d) show the behavior of the self-healing algorithm with the load priority constraint applied. Using bus load priorities as shown in Table X, the buses were able to recover from failure based on their priorities. In FIG. 10(b), voltages are restored in less than 10 seconds which is the typical worst case healing response time. However, bus loads are not connected until all buses with loads of higher priorities have been connected.

E. Attacks

In order to evaluate the performance of the SOCOM-IDS in protecting the smart grid against attacks, several cyber-attack scenarios were developed with the objective of disrupting the smart grid operations and its automation functions. In the exemplary attack scenarios, the cryptographic controls on all the bus controllers were disabled (data is sent and received in plain text), and the intrusion detection relies solely on the SOCOM-IDS model as described in Section III.

Scenario 1: The attacker is able to intercept messages sent between buses 4 and 5. The attacker's goal was to corrupt the state estimation at bus 5 by injecting false current and voltage information into messages sent from bus 4. Thereby, compromising automation functions which rely on the state estimation to operate correctly.

Scenario 2: The attacker generates and sends control messages from bus 5 to neighboring buses using the control vector $a_S^{ext}=\{0, 0, 0, 0\}$ to force switchgear device configuration changes in neighbors of bus 5. The goal of this attack was to disconnect bus 5 from the smart grid causing power failure at bus 5.

Scenario 3: The attacker generates series of messages in a sequence that mimics the self-healing automation function process in order to initiate switchgear connection request from bus 6 to bus 5. Assume that the switchgear device state between bus 5 and 6 is not connected and the attacker understands how the self-healing process works. The goal of the attacker is to force a disruption in the power flow of the smart grid.

Attackers have varying understanding of the power systems domain, SOCOM operational behavior, and physical access levels that impact their ability to circumvent the smart grid. Assume three categories of attackers:

Category 1—The attacker has limited knowledge of the smart grid network protocols, can sniff and the modify network traffic, but has no understanding of how the power systems work or the automation functions that run on the smart grid. Attackers at this level are basically "script-kiddies" that launch random attacks without any clear objective or goal.

Category 2—The attacker has a basic knowledge of the smart grid network protocols and can sniff and modify the network traffic, has a basic understanding of power systems but does know the automation functions that run on the smart grid. The goal of these attackers is to craft valid messages to deceive state estimators in the smart grid or trigger switchgear devices.

Category 3—The attacker has a complete understanding of the smart grid network protocols and a detailed knowledge of the power system functionality. These attackers also have an expert understanding of smart grid automation functions and the underlying processes and network behavior. Attackers at this level are able to craft messages to manipulate automation functions.

In various embodiments, the attacker is either able to break the cryptographic controls or launch the attack from a compromised bus. The SOCOM-IDS was tested against attacks from scenario 1. Assume that the attacker is in category 1 and generates random status messages with modified voltage and current values. The SOCOM-IDS data validation module is quite precise in estimating the expected voltage and current values from connected lines. The error threshold values are determined by obtaining the estimated errors from the system when operating in a known good state. Table IX (as shown in FIG. 21) shows the estimation error under different loading conditions. As shown in Table IX, the SOCOM-IDS can detect even very small modifications have been made to the expected voltage and currents values.

Figure 13A:
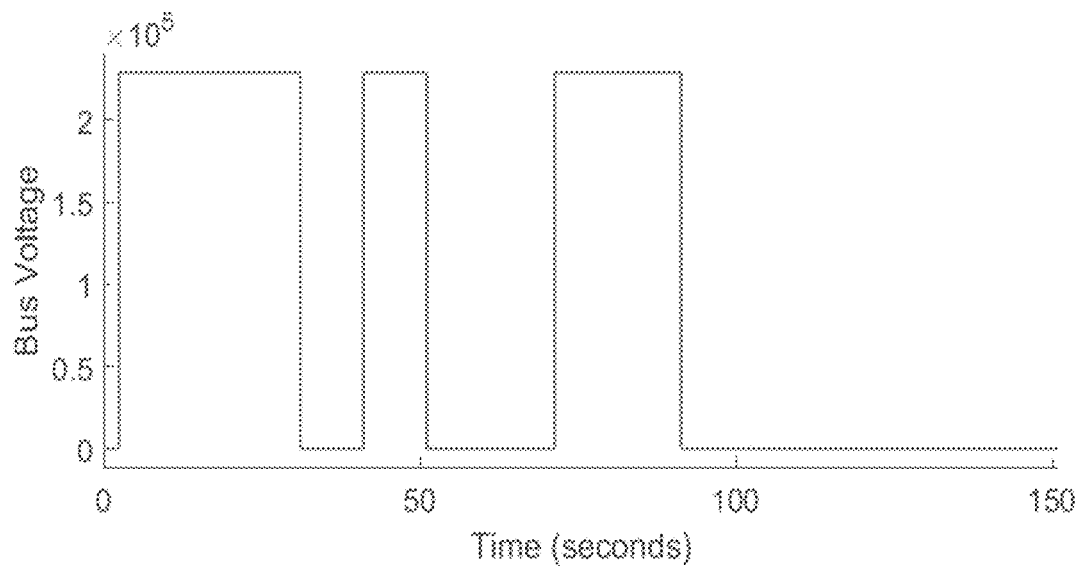
FIG. 13(a) is a graph including exemplary bus voltage measurements, according to one aspect of the present disclosure.
Figure 13B:
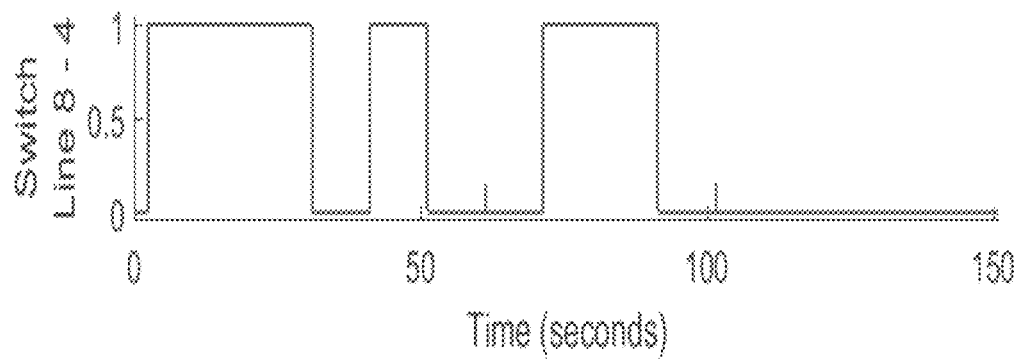
FIG. 13(b) is a graph including exemplary bus switch states, according to one aspect of the present disclosure.

For scenario 2, assume the attacker is in category 2. The attacker (spoofing bus 5) sends valid CRP messages to buses 4, 6, 8, and 9 to disconnect their switchgear device connections to bus 5. The malicious CRP message is detected by the SOCOM-IDS process validation module, the process validation module detects that the malicious CRP message does not belong to any automation function processes running on the smart grid and hence flagged as a false message. FIGS. 13(a)-(b) show the result of this attack when the SOCOM-IDS is turned off. In FIG. 13(b), the attacker sends control signals triggering the switchgear device to toggle between ON and OFF (0 and 1). FIG. 13(a) shows the voltage behavior in response to the attacker's actions.

Figure 14:
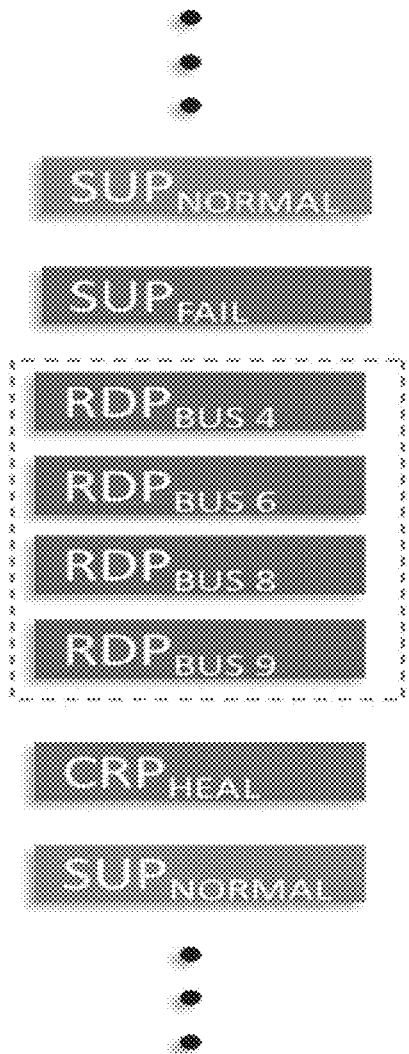
FIG. 14 is a diagram including the SOCOM self-healing process message sequence, according to one aspect of the present disclosure.

Scenario 3 attacker generally belongs to category 3. This attack is detected by the SOCOM-IDS state validation module. FIG. 14 shows the sequence of messages bus 5 receives during a self-healing process initiated by bus 6. As discussed in Section III-B2, bus 4, 6, 8, and 9 sends RDP messages to bus 5 reflecting the same changes in the source and load information. These RDP messages are used in Equation (26) to verify if a failure actually occurred. If there is a significant drop in total power drawn from source buses (bus failure causing load disconnection), then, it can be safely assumed that a power failure has occurred.

F. Response

Figure 11:
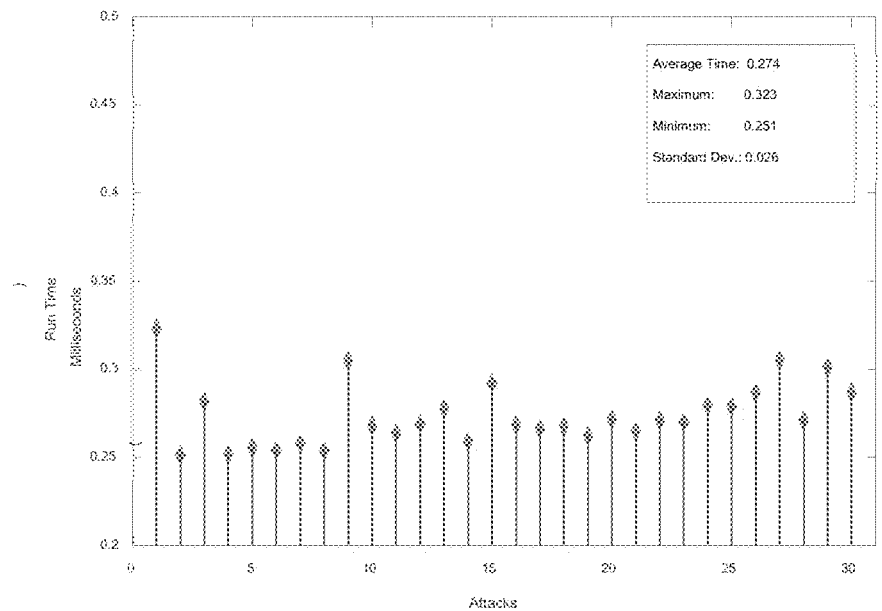
FIG. 11 is a graph illustrating performance of the SOCOM-IDS data validation module, according to one aspect of the present disclosure.
Figure 12:
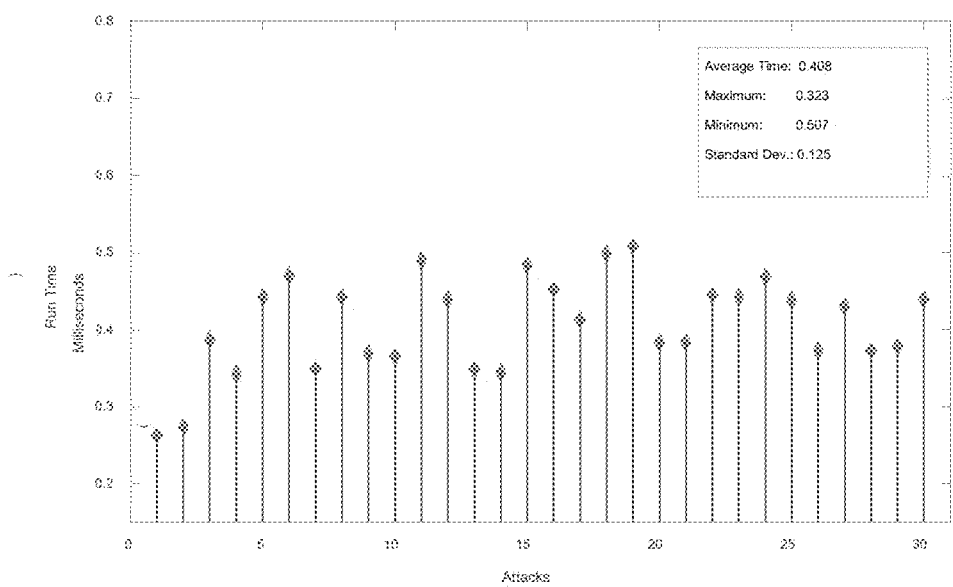
FIG. 12 is a graph illustrating performance of the SOCOM-IDS process validation module, according to one aspect of the present disclosure.

In one embodiment, Section III-B4 of the present disclosure discusses the approach used by the SOCOM-IDS to mitigate attacks. In various embodiments, both the data validation module and the process validation module are on-line modules with response times shown in FIG. 11 and FIG. 12 respectively. In various embodiments, responding to detected attacks may include: 1) raise an alert whenever an attack is detected; 2) randomly change implementation layer after five consecutive attack attempts; 3) if after three implementation layer changes the attack persist, discard further messages originating from the corresponding bus; and, 4) if attack is detected from more than one bus, disable all automation functions. The system may remain at this state until it is reactivated by a human operator.

The goal of the SOCOM-IDS response is to ensure the resiliency of the system against physical or cyber-attacks.

Exemplary Architecture

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc. When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

CONCLUSION

Aspects, features, and benefits of the claimed invention(s) will become apparent from the information disclosed in the exhibits and the other applications as incorporated by reference. Variations and modifications to the disclosed systems and methods may be effected without departing from the spirit and scope of the novel concepts of the disclosure. It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A system comprising:
   a plurality of power consuming nodes connected to an electronic power grid, wherein each of the plurality of power consuming nodes is operatively connected to at least one neighboring power consuming node via a power bus of a plurality of power buses, and wherein each power bus of the plurality of power buses is operatively connected to at least one neighboring power bus via a power transmission line and a communications network; and
   a secure overlay model at one or more power bus controllers, wherein the secure overlay model comprises software-defined logic configured to respond to power-related communications network activity detected at the plurality of power consuming nodes by the one or more power bus controllers, wherein the secure overlay model is operatively configured to:
      identify a data transmission at a power consuming node of the plurality of power consuming nodes, wherein the data transmission is transmitted to the power consuming node over the communications network of a first power bus, and wherein the data transmission comprises at least one data packet including voltage data and current data purported to represent a first bus voltage and a first bus current corresponding to an actual voltage and an actual current at the first power bus;
      determine a second bus voltage and a second bus current corresponding to an actual voltage and an actual current at a second power bus, wherein the second power bus is physically connected to the first power bus by the power transmission line;
      calculate an estimated first bus voltage and an estimated first bus current for the first power bus based on the second bus voltage and the second bus current, and based on a characteristic impedance corresponding to the power transmission line;
      process the at least one data packet of the data transmission via deep packet inspection to identify the voltage data and the current data; and
      determine if a magnitude of the voltage data and a magnitude of the current data are within an error threshold based on the estimated first bus voltage and the estimated first bus current, whereby exceeding the error threshold indicates a potential error in the data transmission in the at least one data packet.

2. The system of claim 1, wherein the software-defined logic is embedded onto a field programmable gate array at the one or more power bus controllers.

3. The system of claim 1, wherein the power-related communications network activity comprises an over-current threshold exceeding a predetermined threshold.

4. The system of claim 3, wherein the predetermined threshold comprises 125% of a rated current.

5. The system of claim 4, wherein in response to detecting an over-current threshold exceeding the predetermined threshold, the secure overlay model is operable to initiate a control request protocol for reconfiguring the electronic power grid, wherein reconfiguring the electronic power grid comprises rearranging switches connecting power lines to a substation of the electronic power grid based on control actions generated by the control request protocol.

6. The system of claim 5, wherein the secure overlay model is further operable to initiate a resource discovery protocol for locating the at least one neighboring power consuming node prior to reconfiguring the electronic power grid.

7. The system of claim 6, wherein the one or more power bus controllers comprise a database for storing information corresponding to neighboring power consuming nodes.

8. The system of claim 5, wherein the secure overlay model is further operable to initiate a status update protocol for determining a status of the at least one neighboring power consuming node prior to reconfiguring the electronic power grid.

9. The system of claim 1, wherein communications between the secure overlay model, the one or more power bus controllers, and the plurality of power consuming nodes are encrypted according to X.509 encryption standards.

10. The system of claim 9, wherein the communications are transmitted via a TCP/IP wrapper.

11. The system of claim 1, wherein the power-related communications network activity comprises an inactive power bus.

12. The system of claim 11, wherein in response to detecting an inactive power bus, the secure overlay model is operable to initiate a control request protocol for reconfiguring the electronic power grid, wherein reconfiguring the electronic power grid comprises rearranging switches connecting power lines to a substation of the electronic power grid based on control actions generated by the control request protocol.

13. The system of claim 12, wherein the secure overlay model is further operable to initiate a resource discovery protocol for locating the at least one neighboring power consuming node prior to reconfiguring the electronic power grid.

14. The system of claim 13, wherein the one or more power bus controllers comprise a database for storing information corresponding to neighboring power consuming nodes.

15. The system of claim 12, wherein the secure overlay model is further operable to initiate a status update protocol for determining a status of the at least one neighboring power consuming node prior to reconfiguring the electronic power grid.

16. The system of claim 11, wherein communications between the secure overlay model, the one or more power bus controllers, and the plurality of power consuming nodes are encrypted according to X.509 encryption standards.

17. The system of claim 16, wherein the communications are transmitted via a TCP/IP wrapper.

18. A method comprising the steps of:
providing a plurality of power consuming nodes connected to an electronic power grid, wherein each of the plurality of power consuming nodes is operatively connected to at least one neighboring power consuming node via a power bus of a plurality of power buses, and wherein each power bus of the plurality of power buses is operatively connected to at least one neighboring power bus via a power transmission line and a communications network; and
providing a secure overlay model at one or more power bus controllers, wherein the secure overlay model comprises software-defined logic configured to respond to power-related communications network activity detected at the plurality of power consuming nodes by the one or more power bus controllers, wherein the secure overlay model is operatively configured to:
identify a data transmission at a power consuming node of the plurality of power consuming nodes, wherein the data transmission is transmitted to the power consuming node over the communications network of a first power bus, and wherein the data transmission comprises at least one data packet including voltage data and current data purported to represent a first bus voltage and a first bus current corresponding to an actual voltage and an actual current at the first power bus;
determine a second bus voltage and a second bus current corresponding to an actual voltage and an actual current at a second power bus, wherein the second power bus is physically connected to the first power bus by the power transmission line;
calculate an estimated first bus voltage and an estimated first bus current for the first power bus based on the second bus voltage and the second bus current, and based on a characteristic impedance corresponding to the power transmission line;
process the at least one data packet of the data transmission via deep packet inspection to identify the voltage data and the current data; and
determine if a magnitude of the voltage data and a magnitude of the current data are within an error threshold based on the estimated first bus voltage and the estimated first bus current, whereby exceeding the error threshold indicates a potential error in the data transmission in the at least one data packet.

19. The method of claim 18, wherein the secure overlay model is further operatively configured to:
in response to determining that the power-related communications network activity detected at the plurality of power consuming nodes by the one or more power bus controllers comprises an over-current threshold exceeding 125% of a rated current, initiate a control request protocol for reconfiguring the electronic power grid, wherein reconfiguring the electronic power grid comprises rearranging switches connecting power lines to a substation of the electronic power grid based on control actions generated by the control request protocol.

20. A tangible, non-transitory, computer readable medium comprising instructions encoded therein, wherein the instructions, when executed by one or more processors included in a secure overlay model at one or more power bus controllers, comprise software-defined logic at the secure overlay model, wherein the software-defined logic is configured to respond to power-related communications network activity detected at a plurality of power consuming nodes by the one or more power bus controllers, and wherein the secure overlay model is operatively configured to:
identify a data transmission at a power consuming node of the plurality of power consuming nodes, wherein the plurality of power consuming nodes are connected to an electronic power grid and each of the plurality of power consuming nodes is operatively connected to at least one neighboring power consuming node via a power bus of a plurality of power buses, wherein each power bus of the plurality of power buses is operatively connected to at least one neighboring power bus via a power transmission line and a communications network, wherein the data transmission is transmitted to the power consuming node over the communications network of a first power bus, and wherein the data transmission comprises at least one data packet including voltage data and current data purported to represent a first bus voltage and a first bus current corresponding to an actual voltage and an actual current at the first power bus;
determine a second bus voltage and a second bus current corresponding to an actual voltage and an actual current at a second power bus, wherein the second power bus is physically connected to the first power bus by the power transmission line;
calculate an estimated first bus voltage and an estimated first bus current for the first power bus based on the second bus voltage and the second bus current, and based on a characteristic impedance corresponding to the power transmission line;
process the at least one data packet of the data transmission via deep packet inspection to identify the voltage data and the current data; and
determine if a magnitude of the voltage data and a magnitude of the current data are within an error threshold based on the estimated first bus voltage and the estimated first bus current, whereby exceeding the error threshold indicates a potential error in the data transmission in the at least one data packet.

\* \* \* \* \*